US010814815B1

(12) United States Patent
Rishi et al.

(10) Patent No.: US 10,814,815 B1
(45) Date of Patent: Oct. 27, 2020

(54) SYSTEM FOR DETERMINING OCCURRENCE OF AN AUTOMOBILE ACCIDENT AND CHARACTERIZING THE ACCIDENT

(71) Applicant: Tangerine Innovation Holding Inc., Lewes, DE (US)

(72) Inventors: Sunija Rishi, Bangalore (IN); Sumit Rishi, Bangalore (IN); Ayush Kochhar, Jaipur (IN); Nirmal Jith Oliyil Unnikrishnan, Cochin (IN); Prashant Badaga, Gulbarga (IN); Vinod Kumar, Bangalore (IN)

(73) Assignee: Tangerine Innovation Holding Inc., Lewes, DE (US)

( * ) Notice: Subject to any disclaimer, the term of this patent is extended or adjusted under 35 U.S.C. 154(b) by 0 days.

(21) Appl. No.: 16/436,955

(22) Filed: Jun. 11, 2019

(51) Int. Cl.
  *B60Q 1/00* (2006.01)
  *B60R 21/0136* (2006.01)
  *G06N 20/00* (2019.01)
  *G07C 5/08* (2006.01)

(52) U.S. Cl.
  CPC ......... *B60R 21/0136* (2013.01); *G06N 20/00* (2019.01); *G07C 5/0866* (2013.01)

(58) Field of Classification Search
  None
  See application file for complete search history.

(56) References Cited

U.S. PATENT DOCUMENTS

| | | | |
|---|---|---|---|
| 2013/0070928 A1* | 3/2013 | Ellis | H04R 25/30 |
| | | | 381/56 |
| 2017/0161614 A1* | 6/2017 | Mehta | G06N 20/00 |
| 2017/0259815 A1* | 9/2017 | Shaker | B60R 22/46 |
| 2018/0126937 A1* | 5/2018 | De Silva | G07C 5/0808 |
| 2019/0005412 A1* | 1/2019 | Matus | G06N 20/00 |
| 2019/0286948 A1* | 9/2019 | Sathyanarayana | B60W 30/095 |

* cited by examiner

*Primary Examiner* — Julie B Lieu
(74) *Attorney, Agent, or Firm* — Benesch, Friedlander, Coplan & Aronoff LLP

(57) ABSTRACT

A deep learning based computer vision system to detect and analyses automobile crash videos comprises a crash detection module and a crash analysis module. The crash detection module uses dashcam video and or telemetry to detect the same. The usage of computer vision algorithm alongside the IMU sensor data make the system robust. The system uses a deep learning model which looks for an anomalous pattern in the video and/or the IMU signal to detect a crash. The system comprises different machine learning and deep learning based computer vision algorithm to analyze the crash detected videos. The system automates the labor-intensive task of reviewing crash videos and generates a crash report comprising accident type, road surface, weather condition and accident scenario among other things. The accident detection and analysis modules can reside on the vehicle as well as on the cloud based on the compute capabilities of the edge device.

17 Claims, 24 Drawing Sheets

SYSTEM FOR DETERMINING OCCURRENCE OF AN AUTOMOBILE ACCIDENT AND CHARACTERIZING THE ACCIDENT

BACKGROUND

Unless otherwise indicated herein, the materials described in this section are not prior art to the claims in this application and are not admitted to being prior art by inclusion in this section.

FIELD OF THE INVENTION

The subject matter in general relates to system for detecting automobile accidents. More particularly, but not exclusively, the subject matter relates to determining and characterizing automobile accidents using computer vision and deep learning techniques.

DISCUSSION OF THE RELATED ART

Detailed information relating to an automobile accident is required to accurately assess the damage and loss associated with an accident. Information pertaining to the accident further helps in analysing the cause of the accident, percentage of negligence of the driver and so on. The detailed information may be obtained from sensor devices on-board vehicle or from video recording, recorded by the dash camera.

Telemetry has been widely used worldwide for analysing data captured by various sensors deployed in vehicles. The sensors deployed on the vehicle may measure the different parameters associated with the vehicle and these measured data may be displayed and processed according to user's specification. The different parameters associated with the vehicle may be acceleration of the automobile, sound during accident and so on. Data from the sensors can be utilized for analysing the cause of the accident and also other parameters such as the weather conditions at the time of the accident, location of the accident, ambient light, presence of rain precipitation, time of occurrence of the accident and so on.

Video recording system may also be used to provide video recordings of the events, incidents, and so on during the accident. The complete journey of the vehicle may be captured using the dash camera out of which, only the events corresponding to an accident may be of interest.

The events corresponding to the accident can be identified from the data obtained from the telemetry and the video with the help of an event trigger. The event trigger can be a sudden deacceleration, sound of tyre squeals, sound of deforming metal and so on. When the measured parameters exceed a trigger point of the trigger event then the event will be labelled as abnormal event.

In certain cases, the trigger point is detected even when the actual trigger has not occurred. That is to say, the system may interpret hard breaking as the accident. In such cases, the system may generate a false positive. As an example, the system may generate a false positive when the driver applies hard break. Further, in certain cases, a minor event trigger may not exceed the trigger point. In such cases, the system will not label the event trigger as anomaly resulting in the generation of a false negative.

In view of foregoing discussions, there is a need for an improved collision detection and collision analysis system, which can minimize false negative and false positive generation.

SUMMARY

A system for determining occurrence of automobile accidents and characterizing the accidents comprises a camera system and one or more video processors. The camera system is disposed in the automobile to capture video. The video processors are configured to feed at least a portion of video captured by the camera system, which comprises neural networks and machine learning models for video analysis. The neural network is trained to infer the accident type by extracting motion features and or mapping spatial orientation of third party vehicles, motor cyclists and pedestrians across video frames.

BRIEF DESCRIPTION OF DIAGRAMS

This disclosure is illustrated by way of example and not limitation in the accompanying figures. Elements illustrated in the figures are not necessarily drawn to scale, in which like references indicate similar elements and in which.

Figure 1:
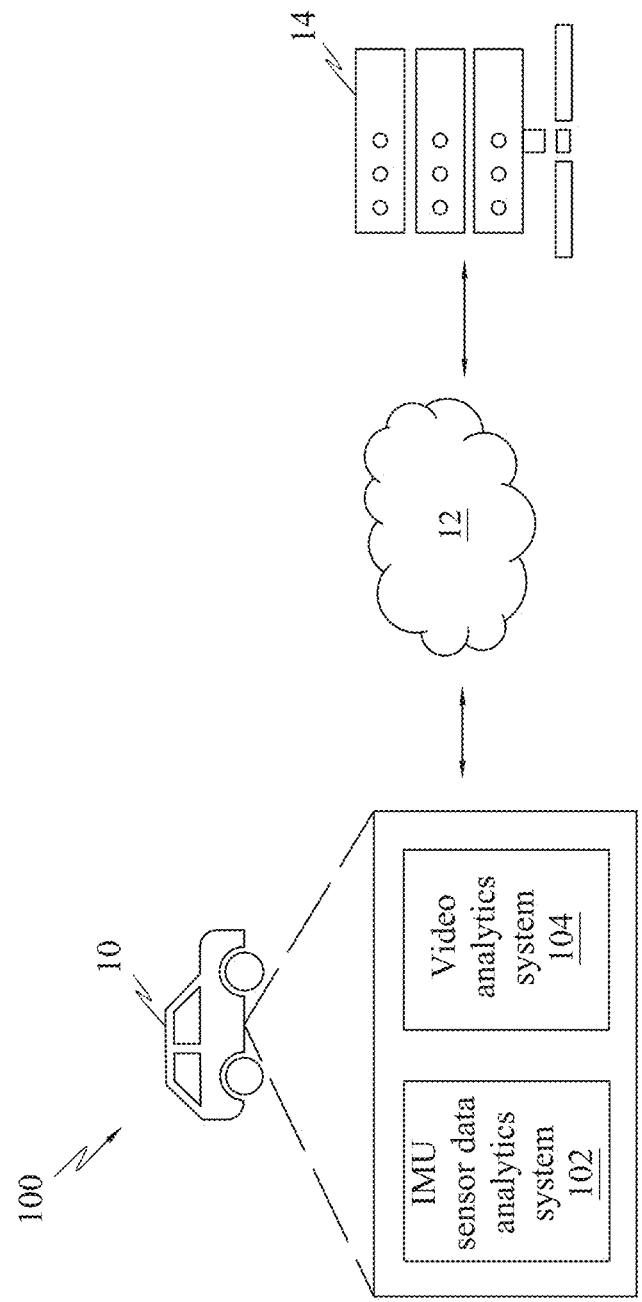
FIG. 1 illustrates a system 100 for determining anomalies corresponding to driving of an automobile 10, in accordance with an embodiment.
Figure 9:
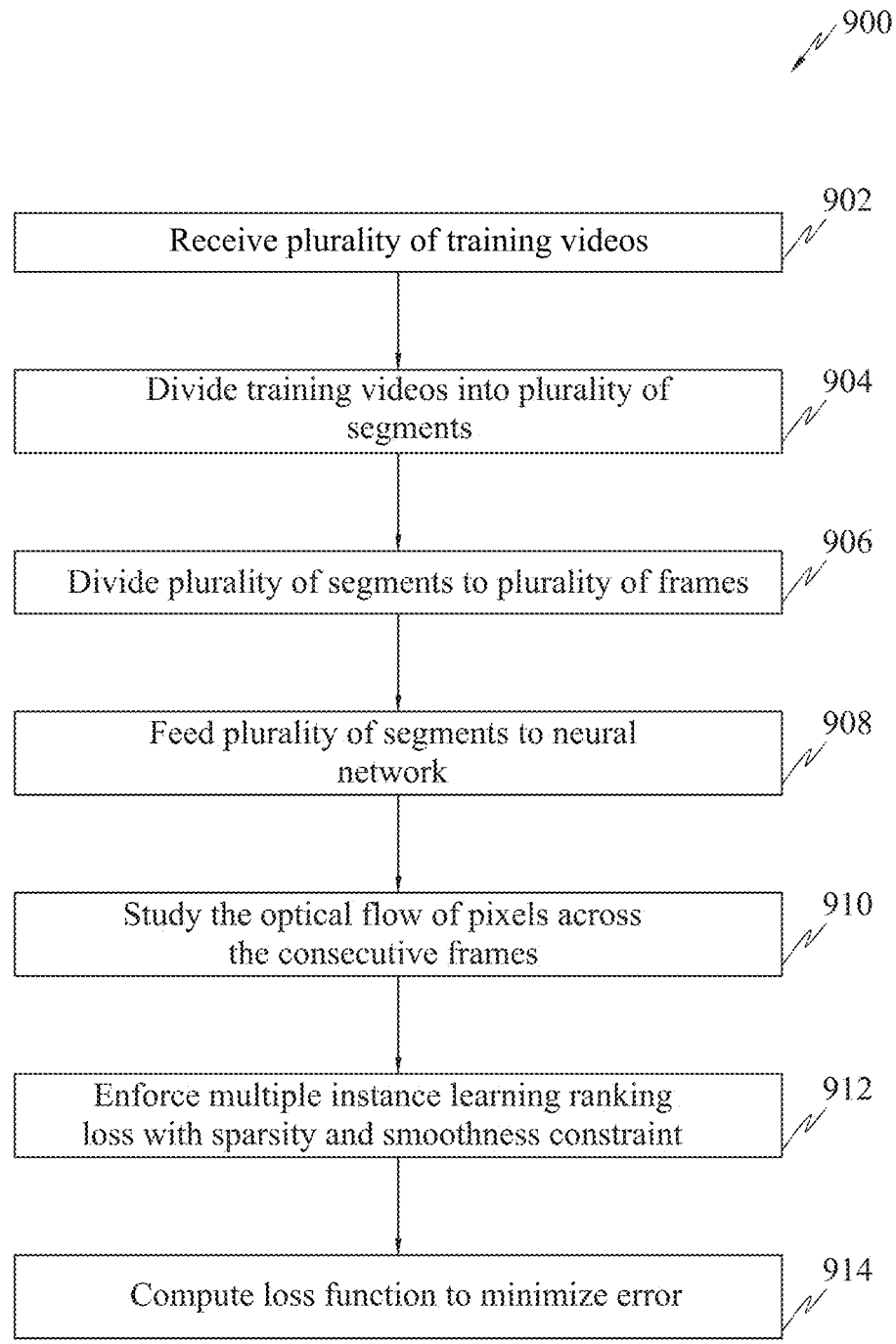
Figure 10:
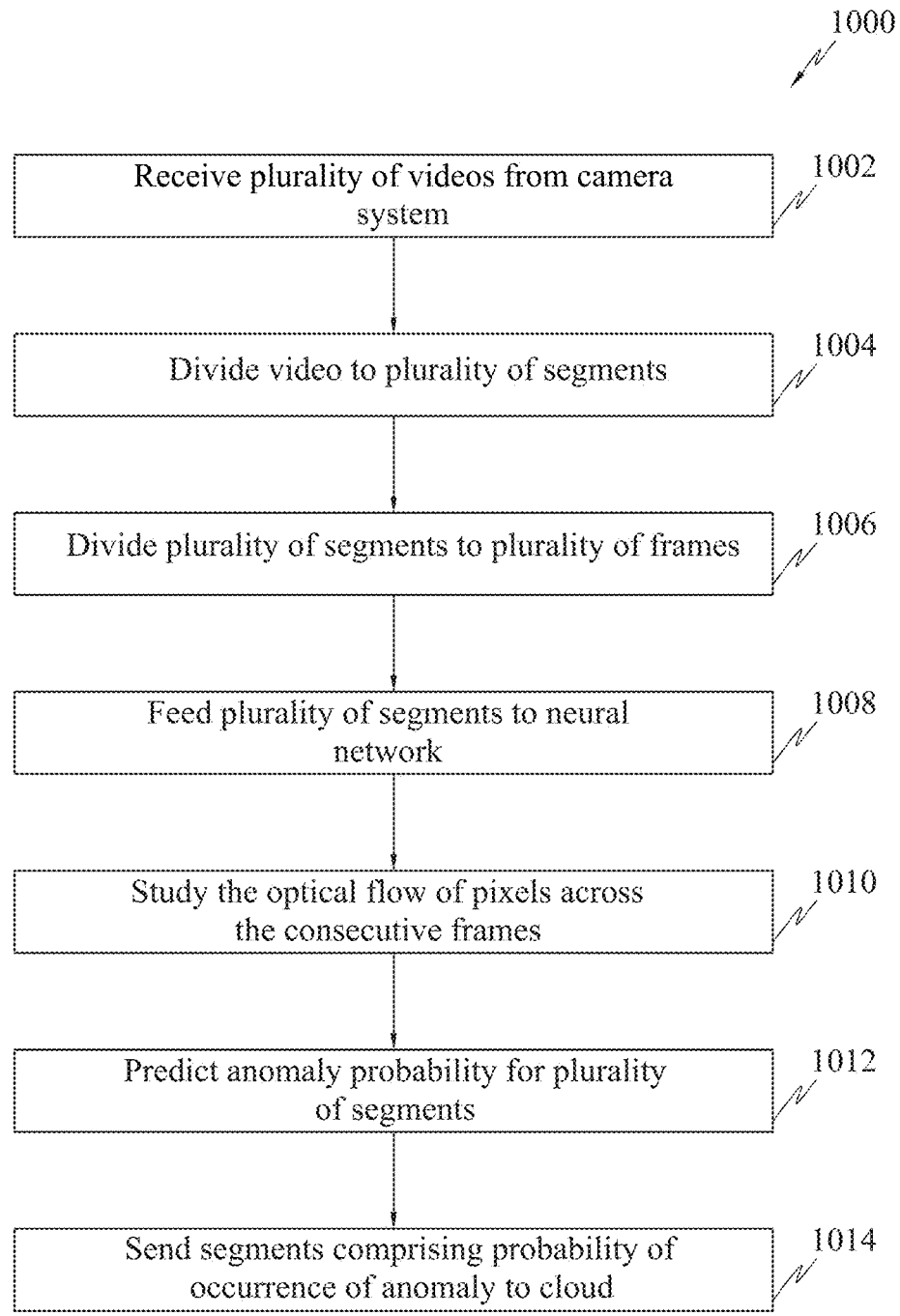
Figure 11:
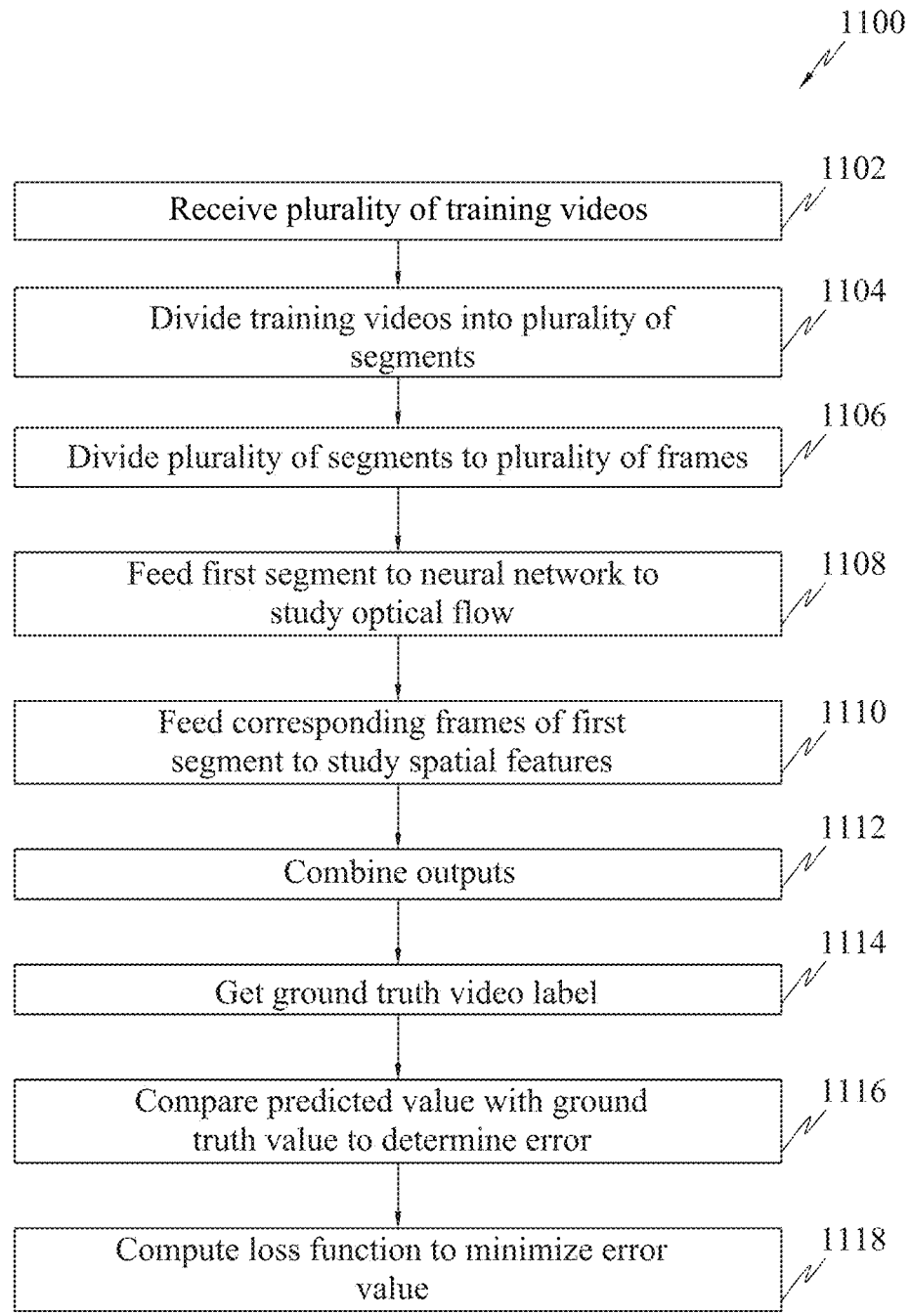
Figure 12:
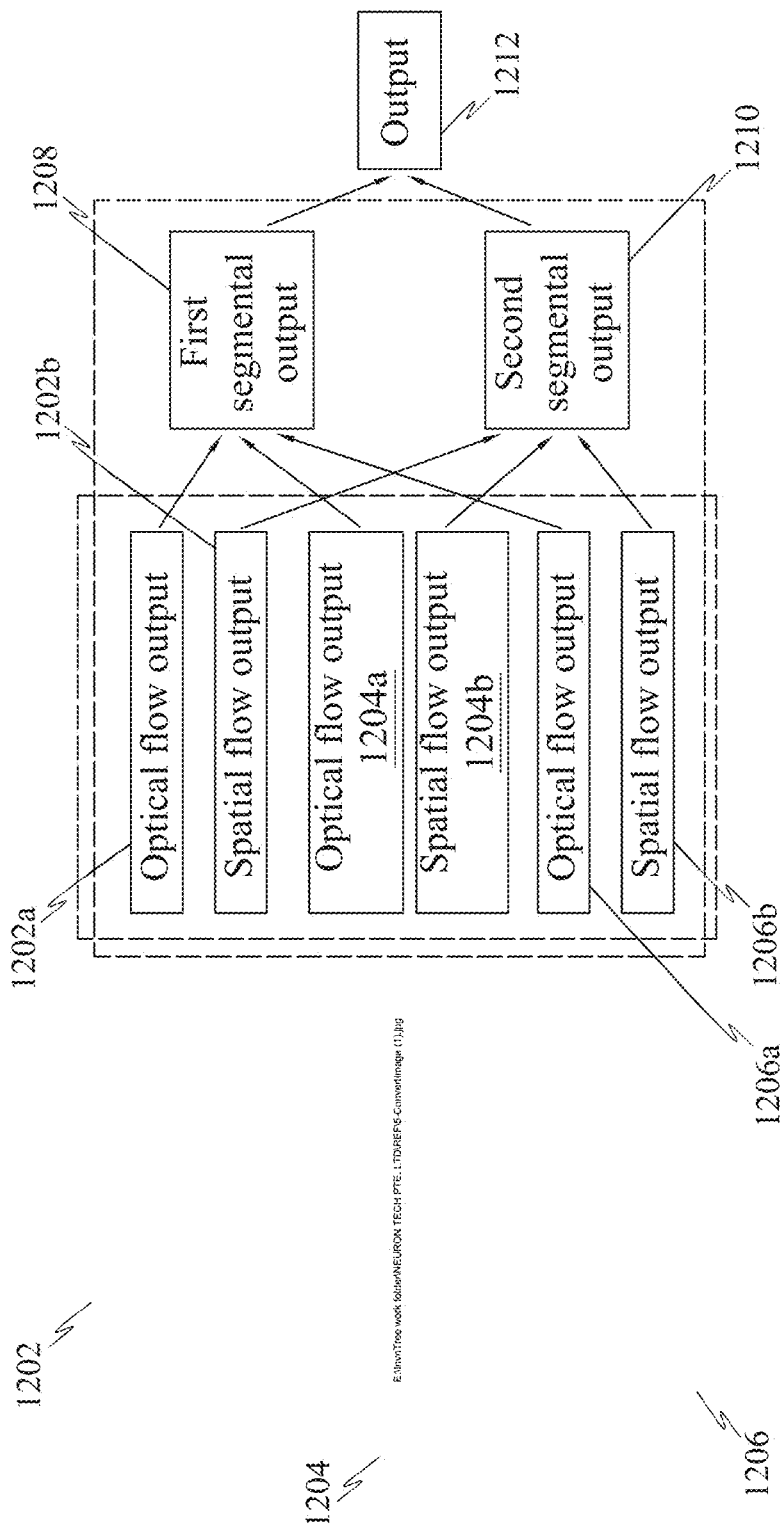
Figure 13:
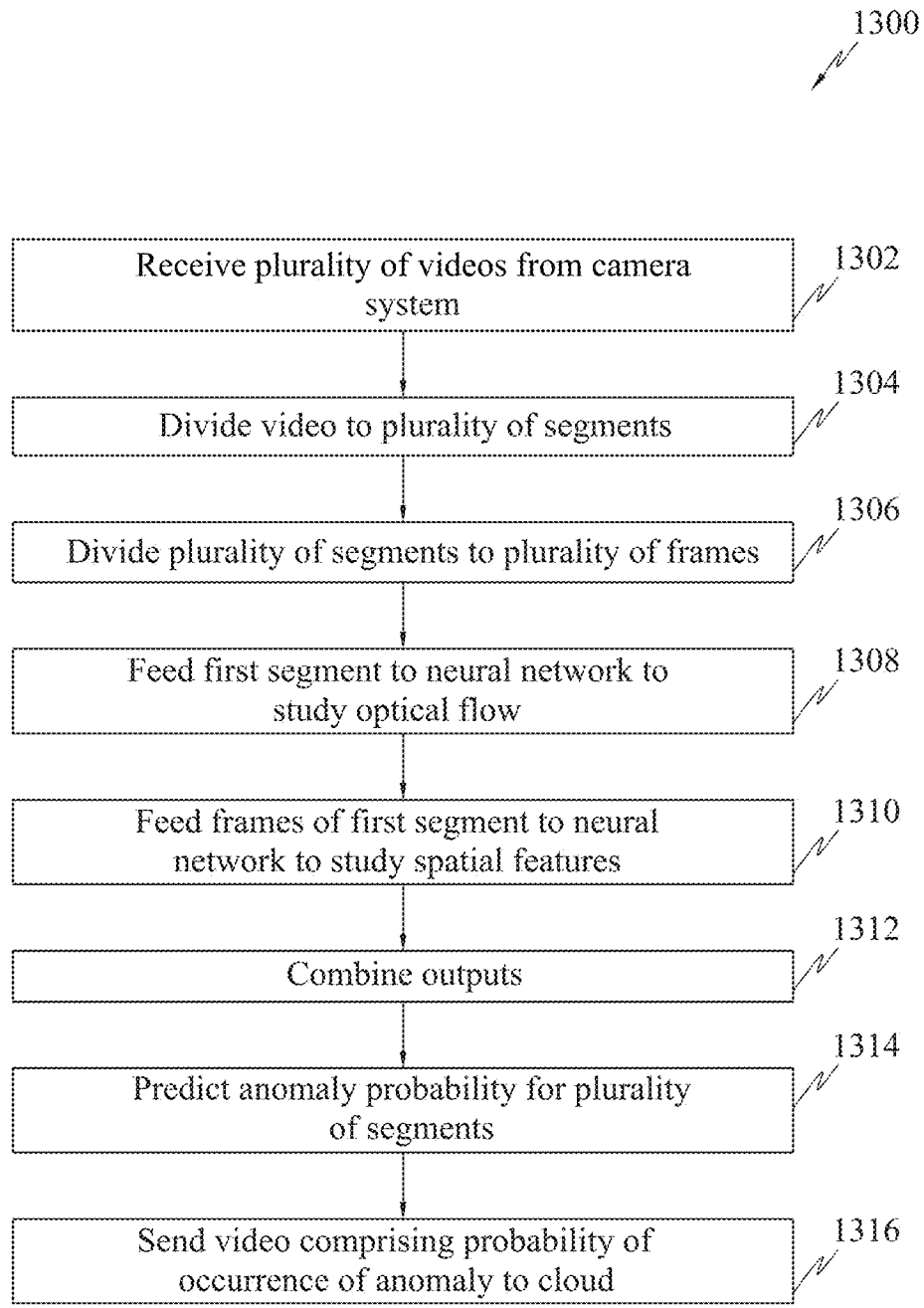
Figure 14A:
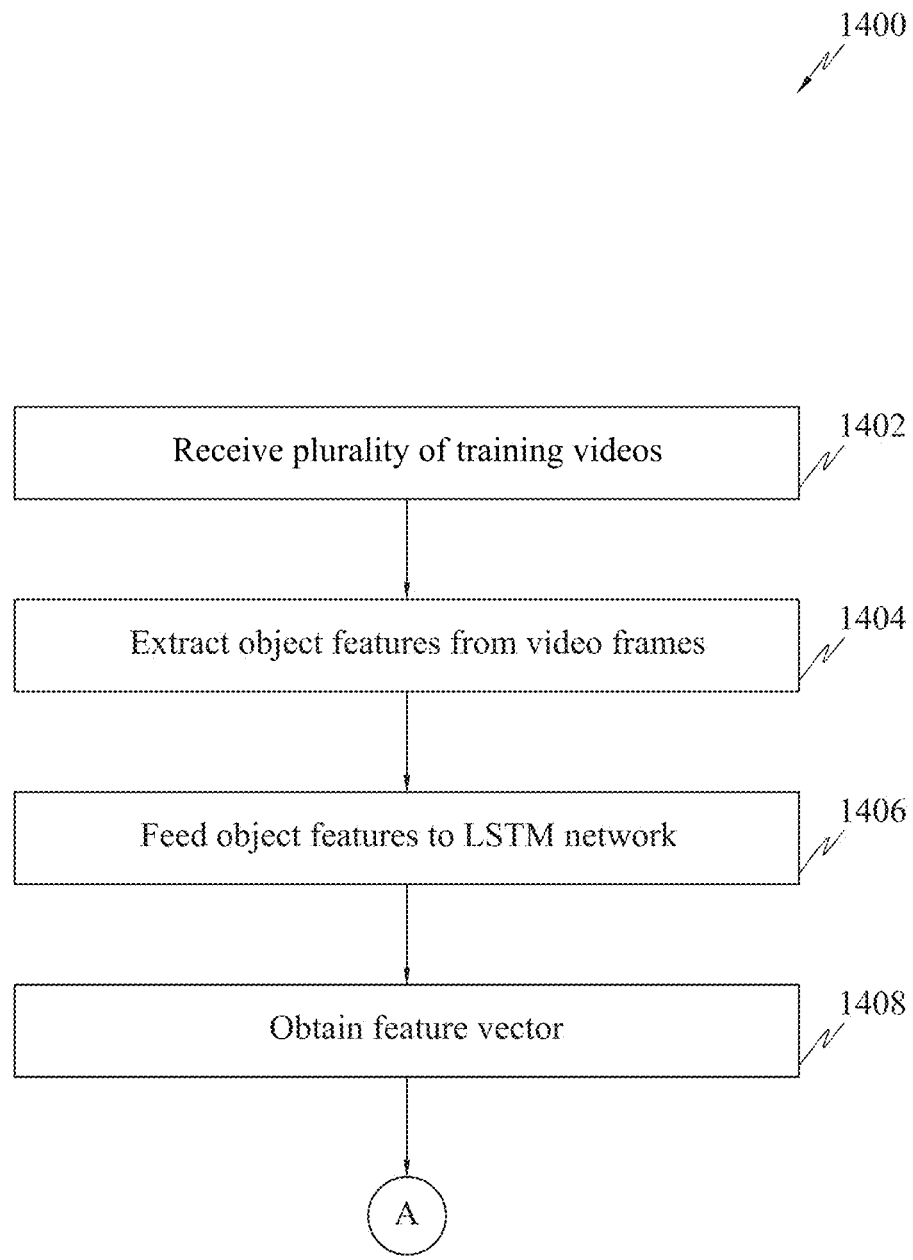
Figure 14B:
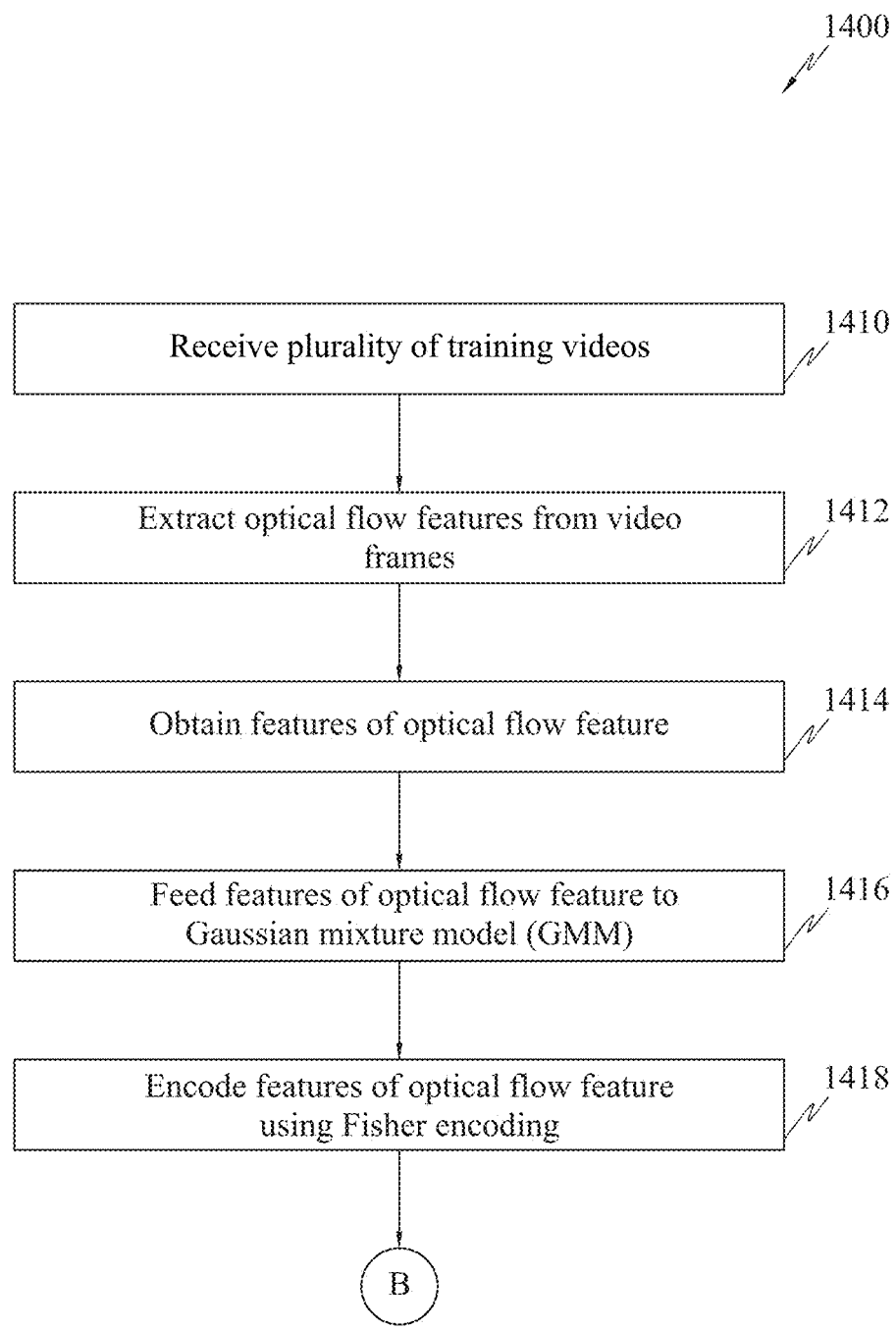
Figure 15:
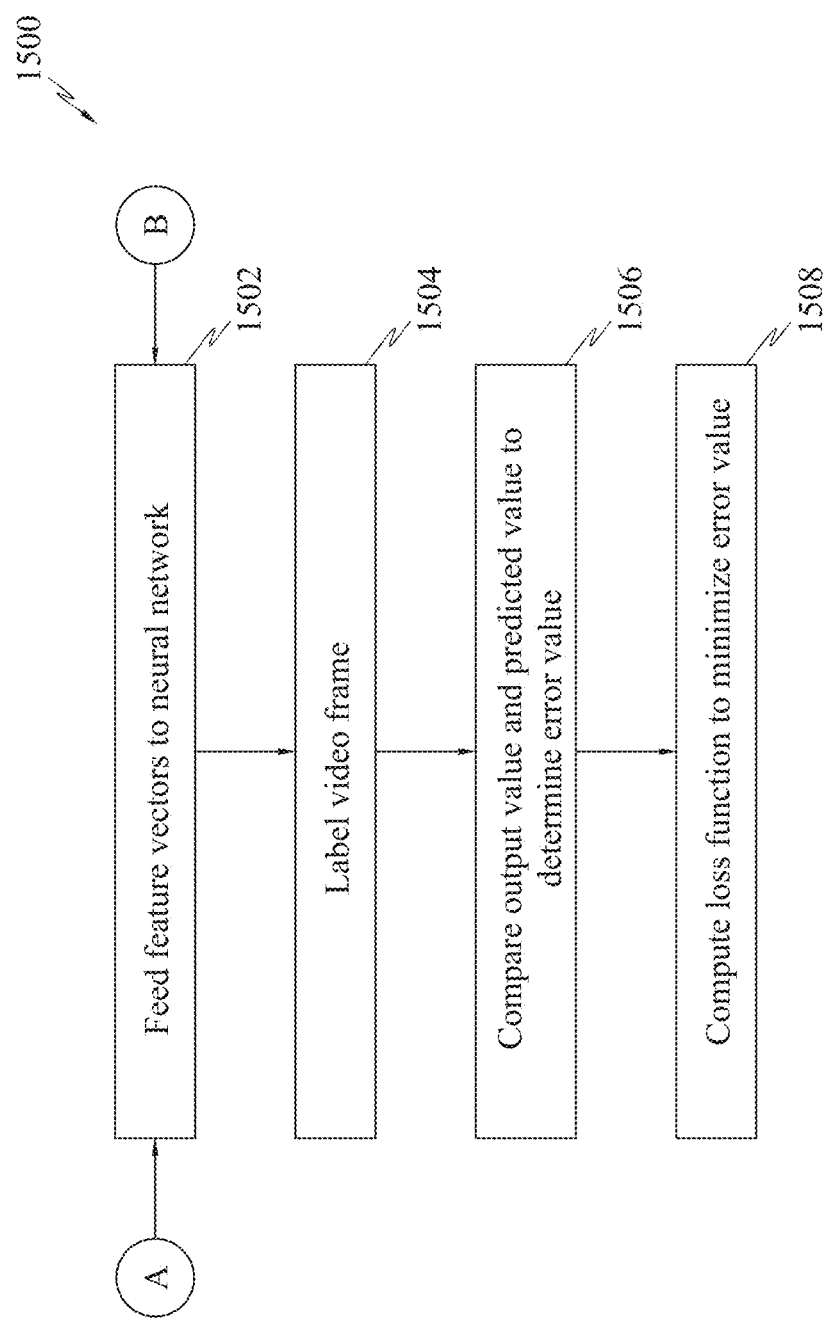
Figure 16A:
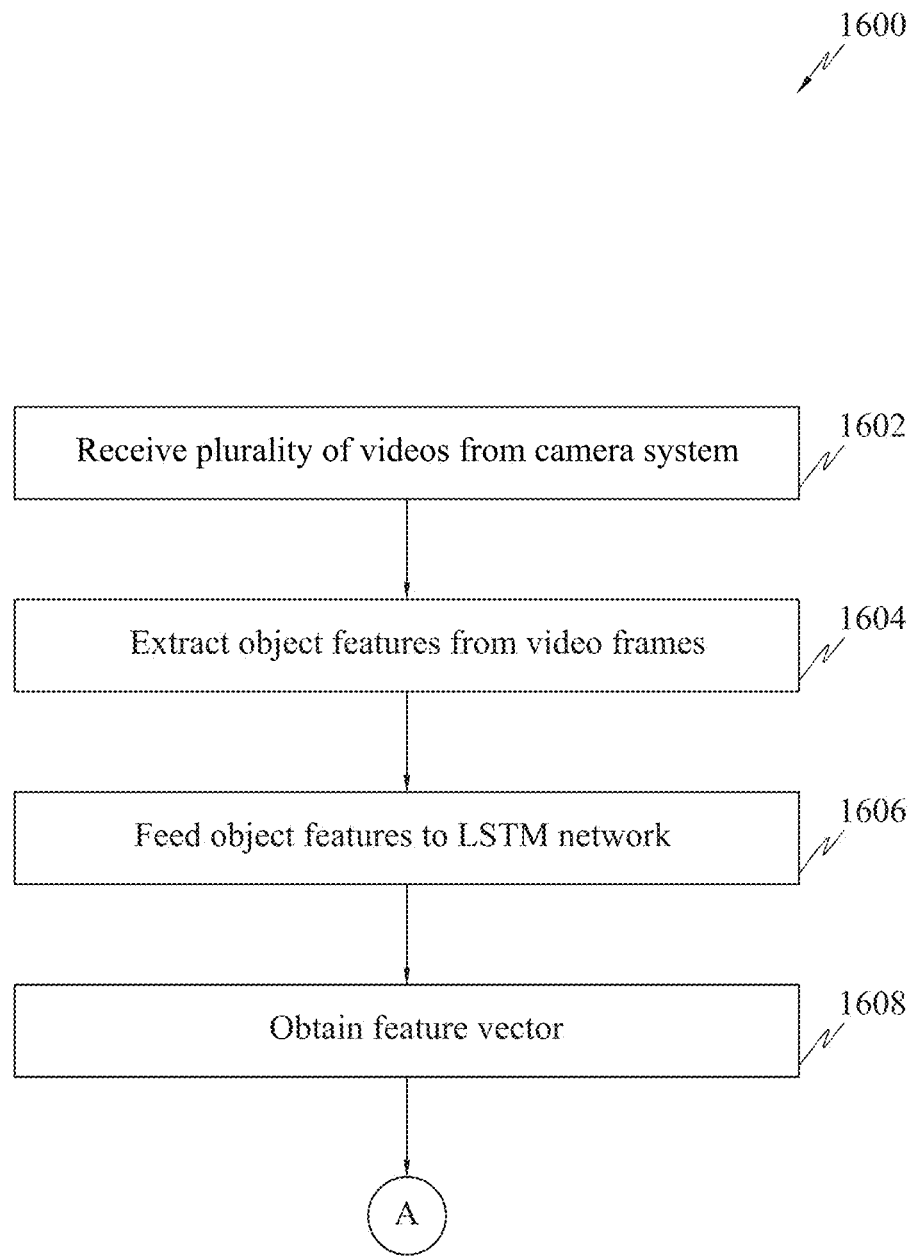
Figure 16B:
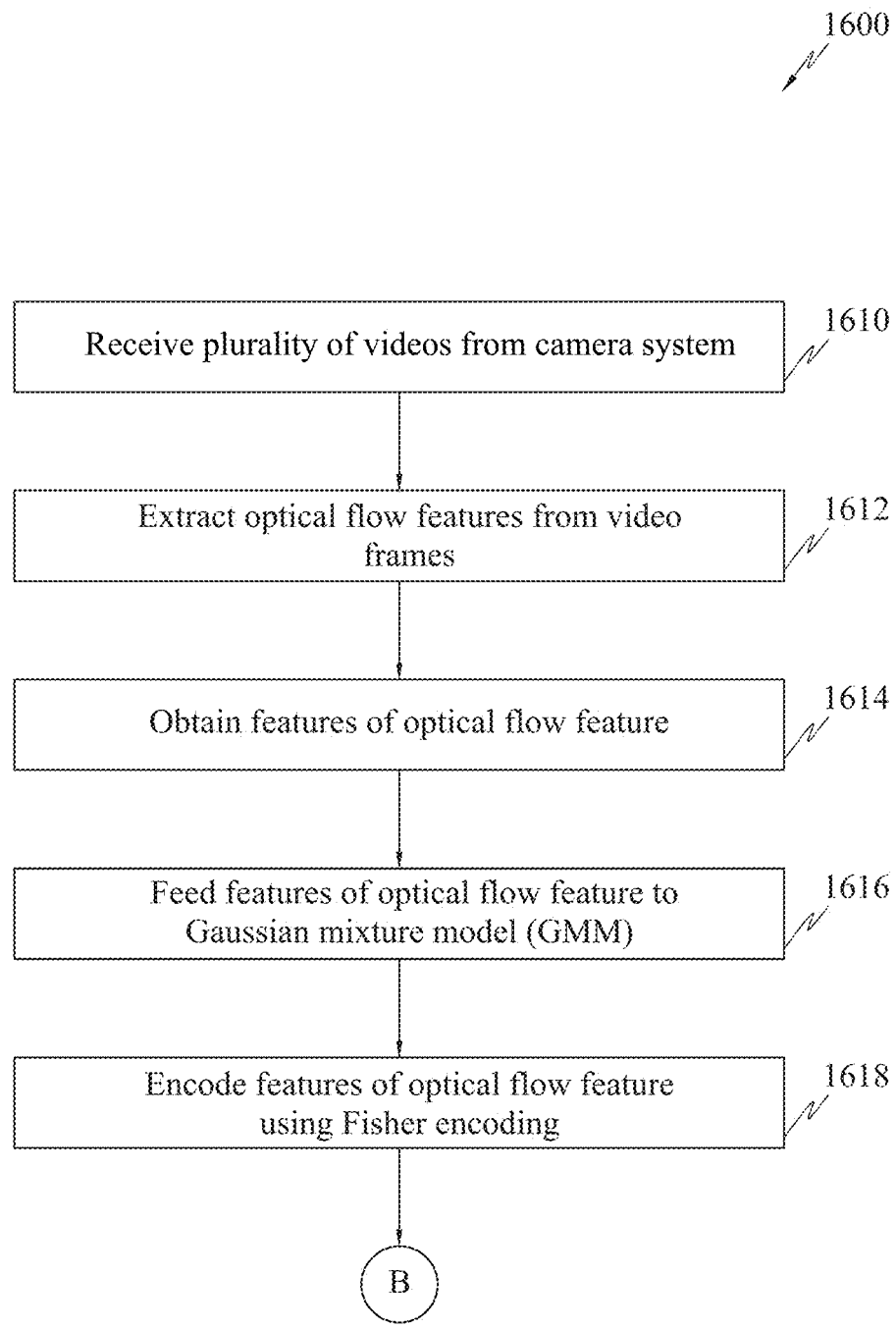
Figure 17:
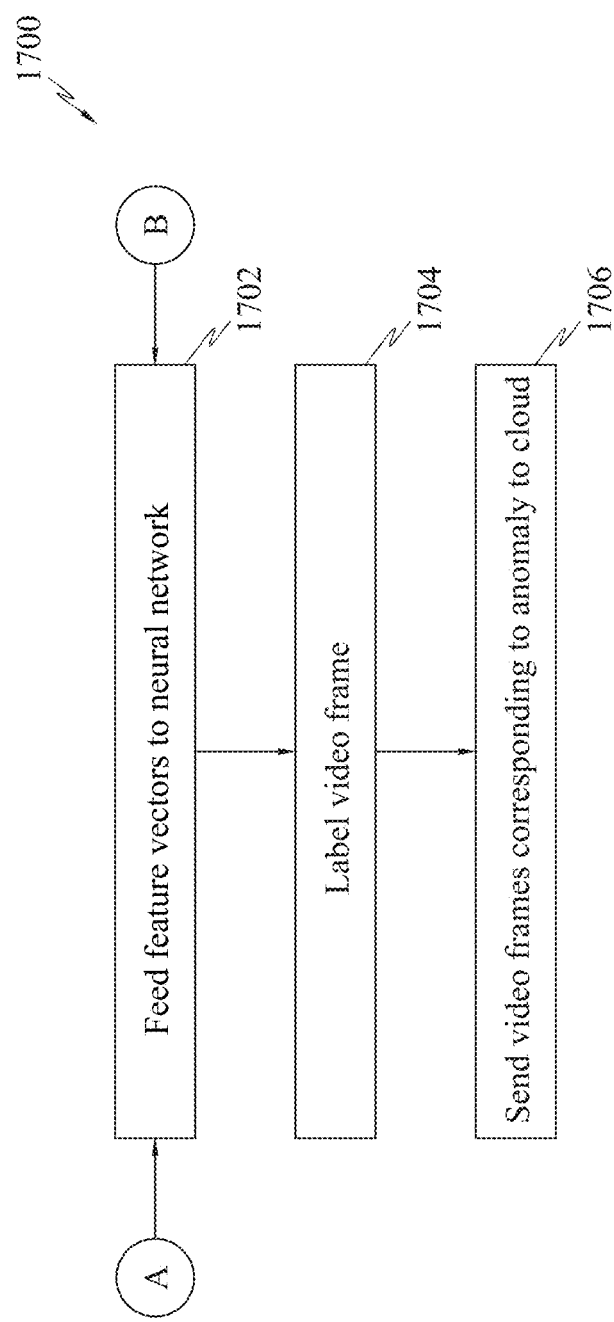
Figure 18:
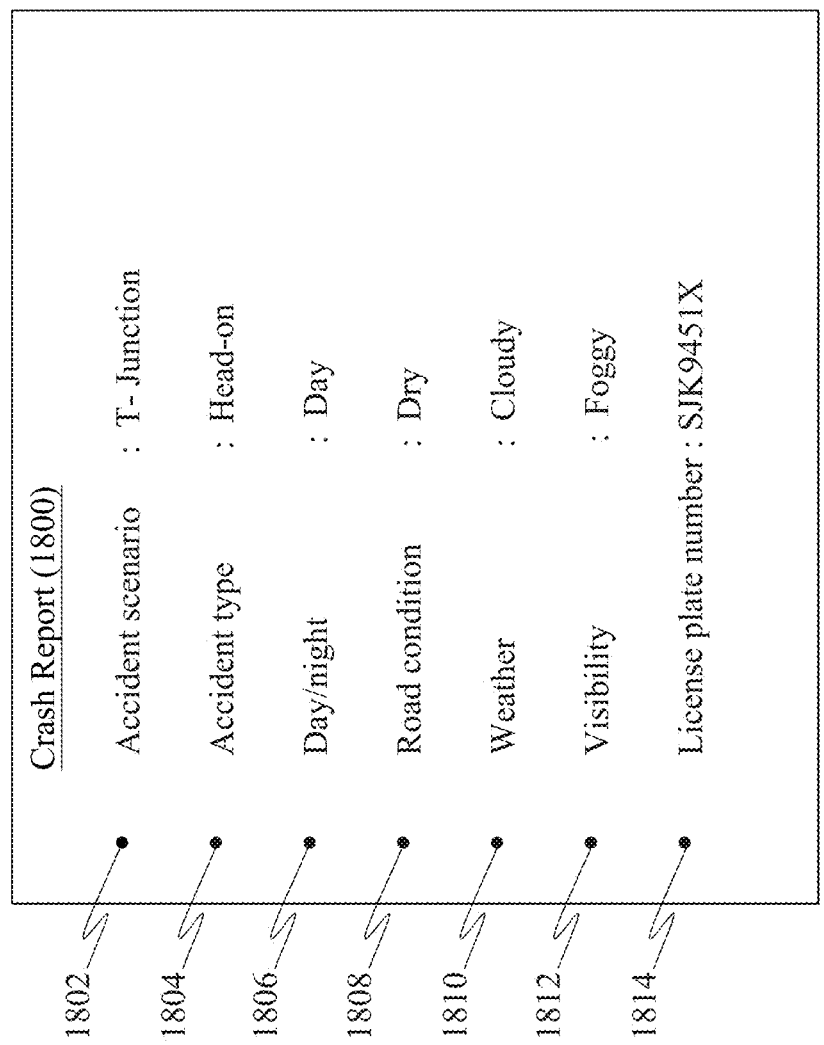
Figure 19:
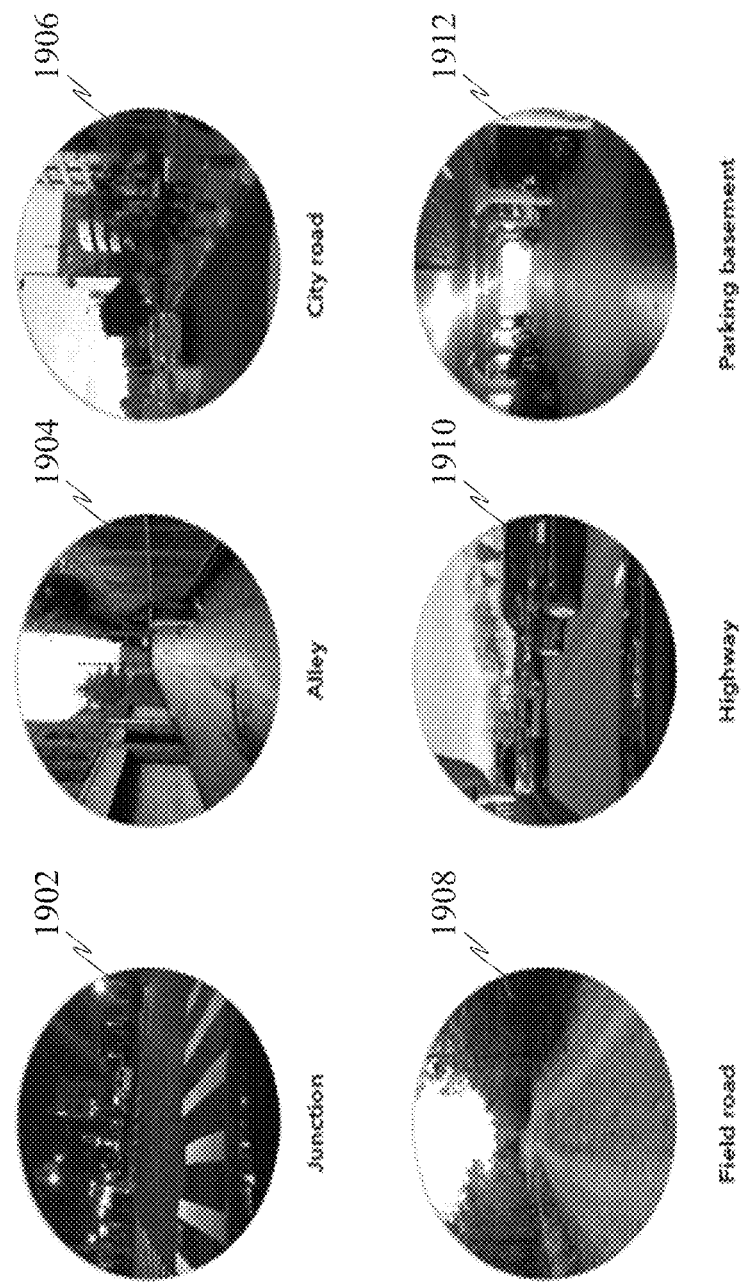
Figure 20:
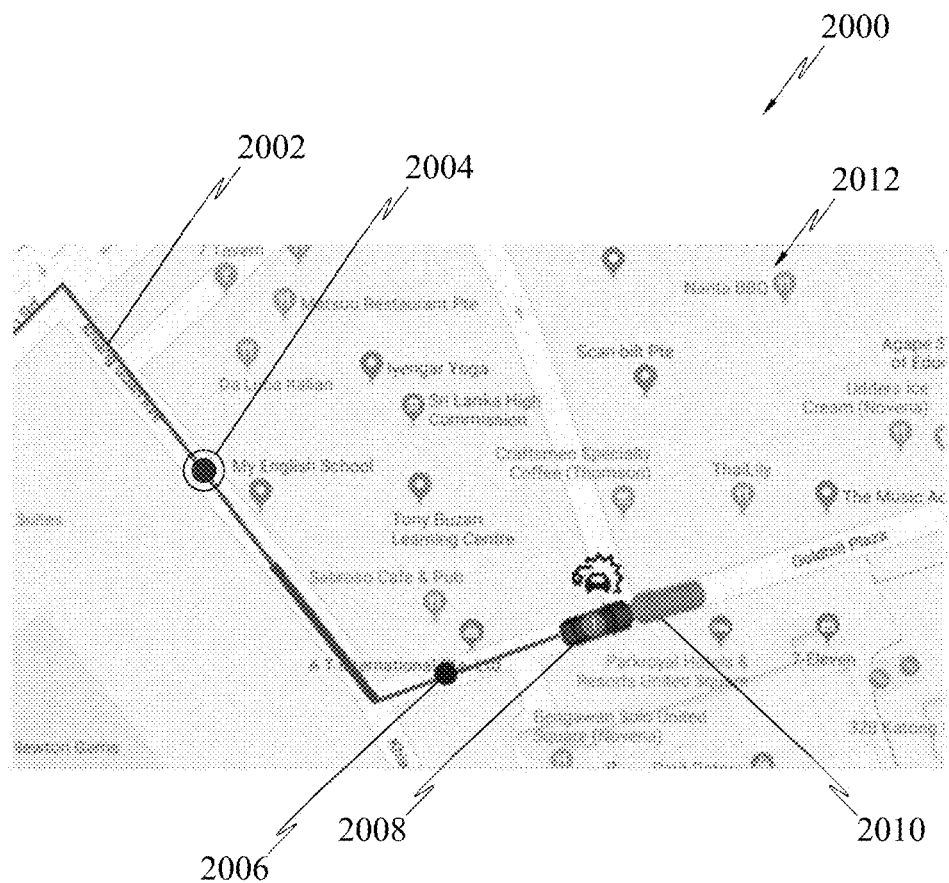
Figure 21:
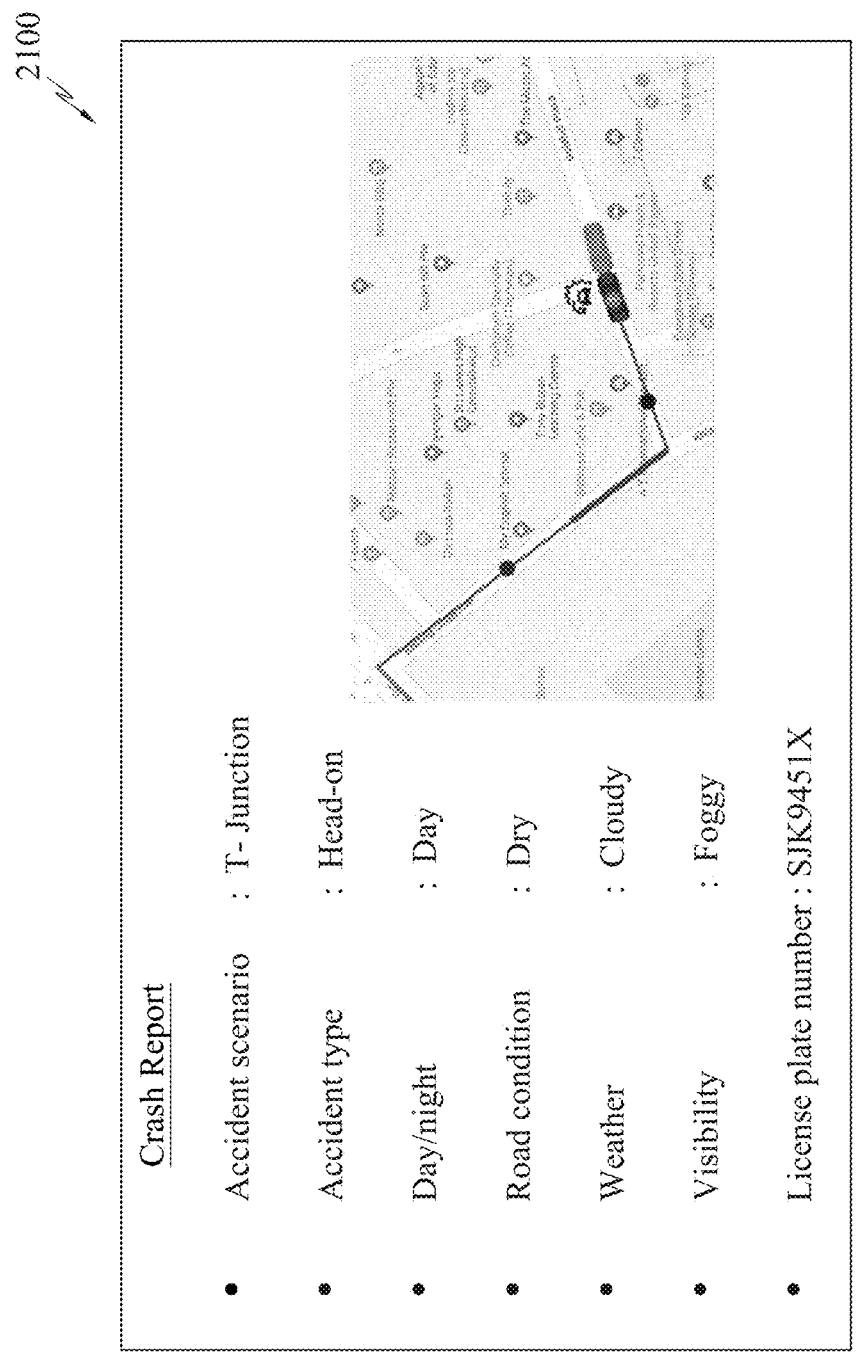
Figure 22:
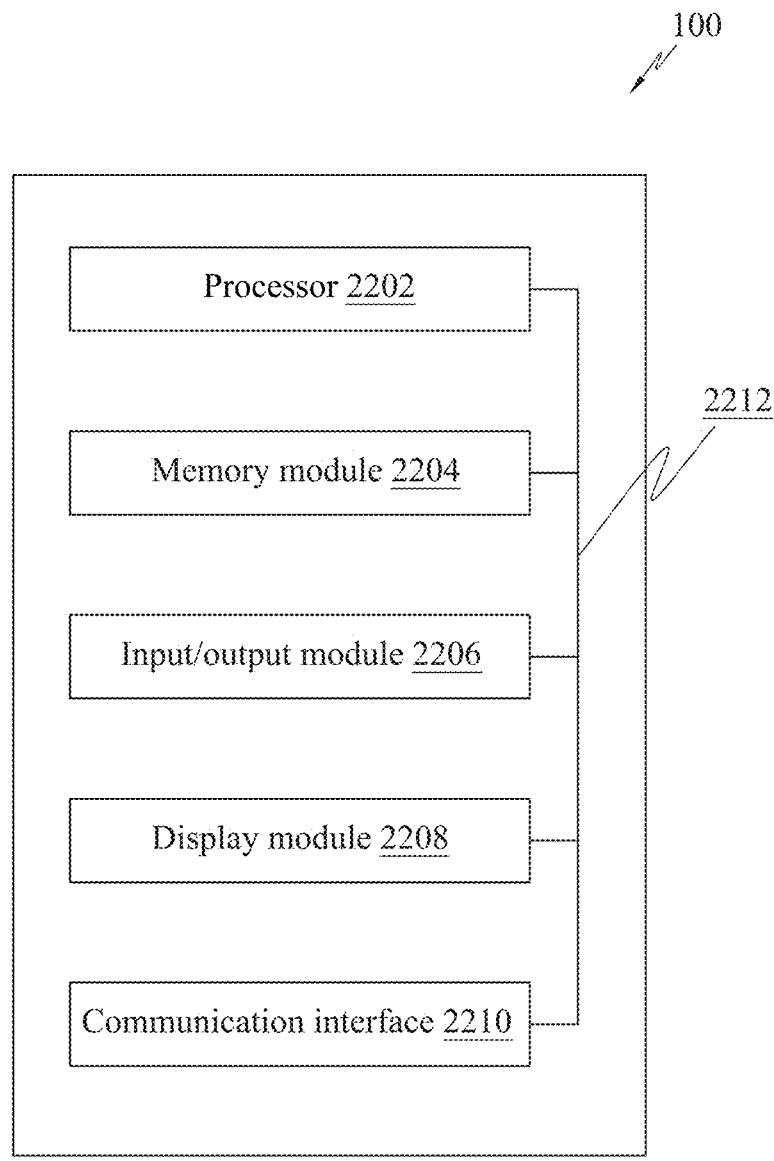

FIG. 9 is a flowchart 900 illustrating a method of training deep learning model 804 of the video analytics system 104, in accordance with an embodiment;

FIG. 10 is a flowchart 1000 illustrating the implementation of the video analytics system 104, in accordance with an embodiment;

FIG. 11 is a flowchart 1100 illustrating training of deep learning model 804 of the video analytics system 104, in accordance with another embodiment;

FIG. 12 is an architecture illustrating training of the deep learning model 804, in accordance with another embodiment;

FIG. 13 is a flowchart 1300 illustrating the implementation of the video analytics system 104, in accordance with an embodiment;

FIG. 14A-B depict a flowchart 1400 illustrating yet another method of training the deep learning model 804 of the video analytics system 104, in accordance with yet another embodiment;

FIG. 15 illustrate a combined output obtained from steps 1408 and 1418 (flowchart 1400), in accordance with an embodiment;

FIGS. 16A-B depict a flowchart 1600, illustrating the implementation of the video analytics system 104, in accordance with an embodiment;

FIG. 17 illustrates a combined output obtained from steps 1608 and 1618 (flowchart 1600), in accordance with an embodiment;

FIG. 18 illustrates an exemplary crash report 1800, in accordance with an embodiment;

FIG. 19 illustrates various accident scenarios, in accordance with an embodiment;

FIG. 20 illustrates an exemplary sketch plan 2000, in accordance with an embodiment;

FIG. 21 illustrates a final crash report 2100, in accordance with an embodiment; and FIG. 22 is a block diagram illustrating hardware elements of the system 100 of FIG. 1, in accordance with an embodiment.

DETAILED DESCRIPTION OF THE INVENTION

The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

It should be understood that the capabilities of the invention described in the present disclosure and elements shown in the figures may be implemented in various forms of hardware, firmware, software, recordable medium or combinations thereof.

Referring to the figures, and more particularly to FIG. 1, a system 100 for determining anomalies corresponding to an automobile 10 is disclosed, in accordance with an embodiment. The system 100 may comprise an IMU sensor data analytics system 102 and a video analytics system 104 provided in an automobile 10. Further, the systems 102 and 104 are configured to communicate with a server 14 via a communication network 12. The communication network 12 may be a cloud communication network. The server 14 may comprise a report generator module.

In an embodiment, the IMU sensor data analytics system 102 may detect an anomaly corresponding to an automobile 10. The anomaly may be an accident. The anomaly may be detected based on a threshold trigger.

In an embodiment, the video analytics system 104 may capture video feeds corresponding to the automobile 10. The video analytics system 104 may be configured to detect the anomaly corresponding to the automobile 10. The video analytics system 104 may be trained to determine the anomaly present in a video feed. The video corresponding to the anomaly may be sent to the cloud 12 for further analysis.

In an embodiment, the video analytics system 104 may be configured to obtain the video corresponding to the trigger obtained using the IMU sensor data analytics system 102. The corresponding video may be communicated to the cloud 12. The scrutiny of the scenario in the video feed may be further analysed using the corresponding video feed.

Figure 2:
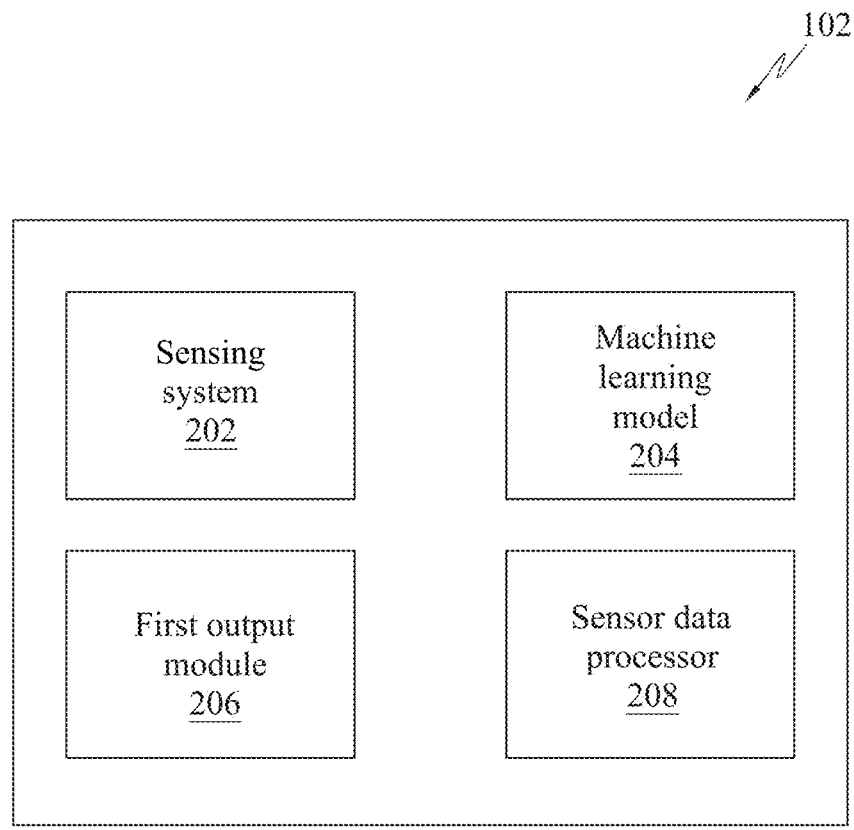
FIG. 2 illustrates various modules of a IMU sensor data analytics system 102 of the system 100, in accordance with an embodiment.

In an embodiment, the report generator may generate a crash report 1800 using output obtained from the IMU sensor data analytics system 102 and the video analytics system 104 to generate the crash report 1800. Referring to FIG. 2, various modules of the IMU sensor data analytics system 102 of the system 100, in accordance with an embodiment are disclosed. The IMU sensor data analytics system 102 may include a sensing system 202, a machine learning model 204, a first output module 206 and a sensor data processor 208.

In an embodiment, the sensing system 202 may be configured to detect and respond to different inputs from physical environment of the automobile 10. The sensing system 202 may include a motion sensor. The motion sensor may be an accelerometer. The accelerometer may be configured to detect and measure the acceleration of the automobile 10. The sensing system 202 may also include a GPS (Global Positioning System) tracker. The sensing system 202 may be a telemetry device.

In an embodiment, the sensing system 202 may be an inertial measurement unit (IMU). The IMU 202 may be an electronic device that may measure and report the automobile's 10 specific force, angular rate and so on. The IMU 202 may utilize a combination of accelerometers and gyroscopes and magnetometers.

In an embodiment, the machine learning model 204 may be an artificial neural networking architecture, configured to learn data encoding in an unsupervised manner. The machine learning model 204 may be an LSTM autoencoder that may include an encoder and a decoder. The encoder may be configured to compress an input into encodings and the decoder may be configured to decode the encodings into the input.

In an embodiment, the LSTM autoencoder 204 may include a conventional LSTM (long short term memory) encoder-decoder architecture. The LSTM architecture may include hidden layers that describes the code, wherein the code is used to represent the input. The architecture is configured to read an input sequence and encode the input sequence into a fixed-length vector using the encoder and decode the fixed-length vector into the predicted (input) sequence using the decoder.

In an embodiment, the sensor data processor 208 may be implemented in the form of one or more processors and may be implemented as appropriate in hardware, computer executable instructions, firmware, or combinations thereof. Computer-executable instruction or firmware implementations of the sensor data processor 208 may include computer-executable or machine-executable instructions written in any suitable programming language to perform the various functions described. Further, the sensor data processor 208 may execute instructions, provided by the various modules of the IMU sensor data analytics system 102.

In an embodiment, a plurality of acceleration data points may be fed to the encoder of the LSTM autoencoder 204. The encoder may encode the acceleration data points to feature encodings of acceleration data points. These encoded acceleration data points may be termed as encoded feature points of the input acceleration data points. As an example, the encoder may be fed with 20 input acceleration data points. The encoder may encode the 20 acceleration data points into 5 encoded feature points. The encoded feature points may be analyzed for determining the probability of occurrence of the anomaly.

In an embodiment, the first output module 206 may generate the output of the IMU sensor data analytics system 102. The output may be a probability index of the occurrence of the anomaly corresponding to the automobile 10. The anomaly may be an automobile accident.

Having discussed about the various modules of the IMU sensor data analytics system 102, the steps involved in building a training model is discussed hereunder.

The IMU sensor data analytics system 102 may be trained by the training model. The trained model may be installed into the automobile 10 for real time surveillance.

Figure 3:
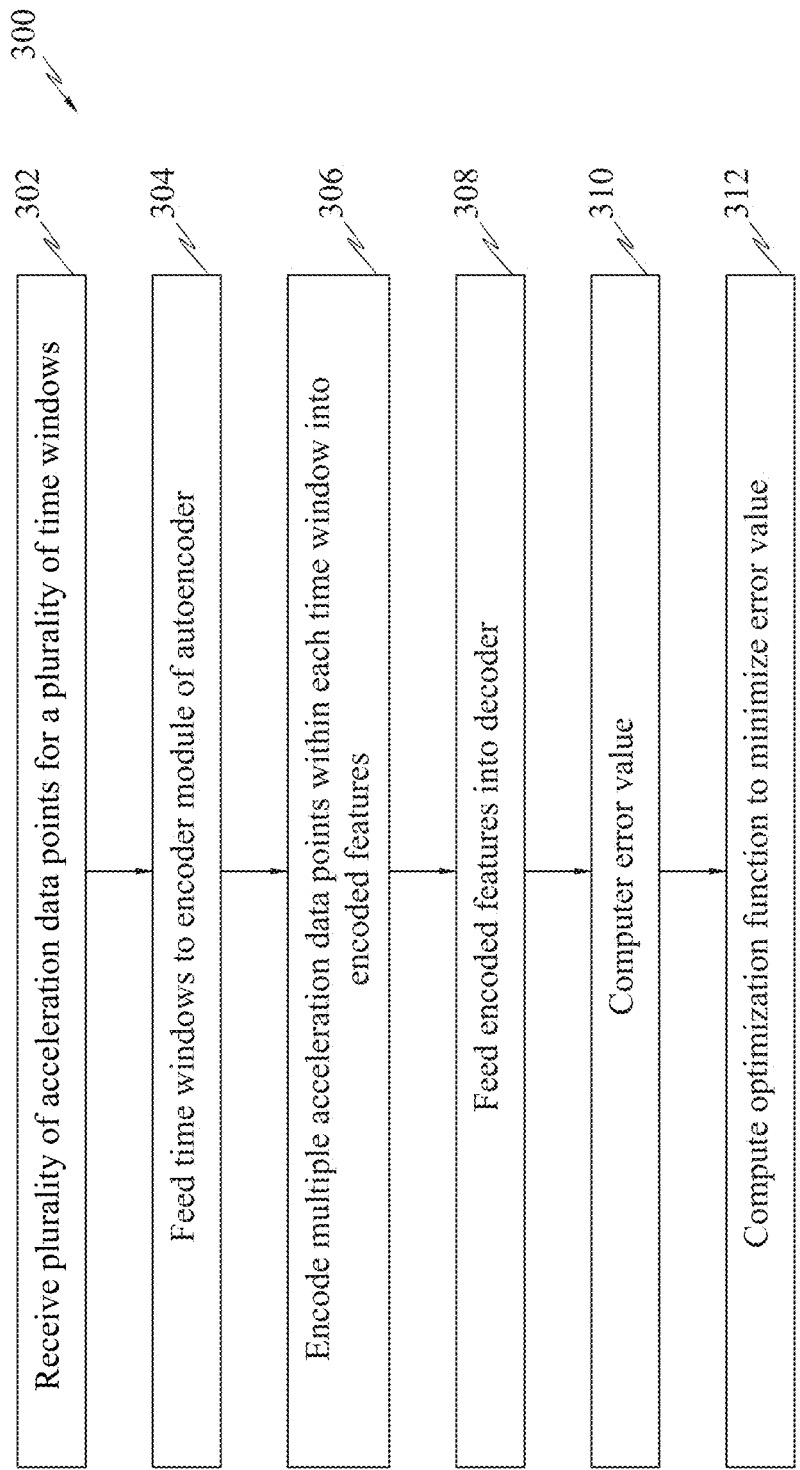
FIG. 3 is a flowchart 300, illustrating the steps involved in building a training model, in accordance with an embodiment.

Referring to FIG. 3, a flowchart 300 illustrating the steps involved in building the training model is disclosed, in accordance with an embodiment.

Figure 4:
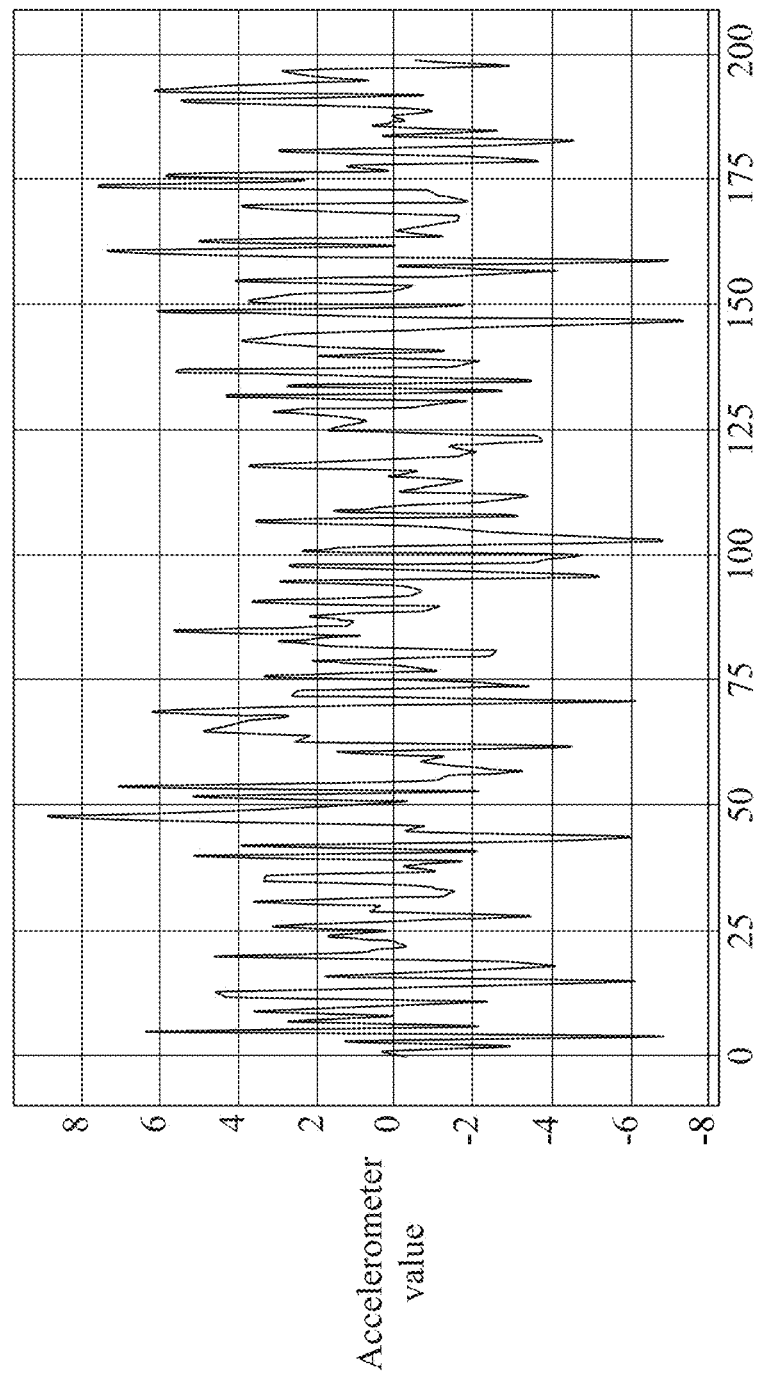
FIG. 4 illustrates a plot of acceleration data points of a time window, in accordance with an embodiment.

In an embodiment, at step 302, the training model may receive the plurality of acceleration data points corresponding to a plurality of time windows. The plurality of acceleration data points may be provided manually. The plurality of acceleration data points may comprise of certain anomalies, that may be fed to the encoder of the LSTM autoencoder 204. FIG. 4 illustrates a plot of plurality of input acceleration data points. The corresponding plurality of input acceleration data points are fed to the LSTM autoencoder 204. Depending upon the number of acceleration data points, a frequency "n" may be set to determine the time windows for the corresponding plurality of acceleration data points. As an example, let the number of acceleration data points be 20 and the frequency be 10. Then a time window of 2 seconds may be obtained, wherein each of the time windows may comprise 20 acceleration data points.

In an embodiment, the acceleration data points may be distributed in such a way that acceleration data points of time window may overlap acceleration data points of consecutive time window. As an example, a first time window may comprise acceleration data points 0-20, a second time window may comprise acceleration data points 18-38 and so on. The time windows may be overlapped to ensure that, the information corresponding to the acceleration data points is not lost.

In an embodiment, at step 304, the time windows are fed to the encoder of the LSTM autoencoder 204.

Figure 5:
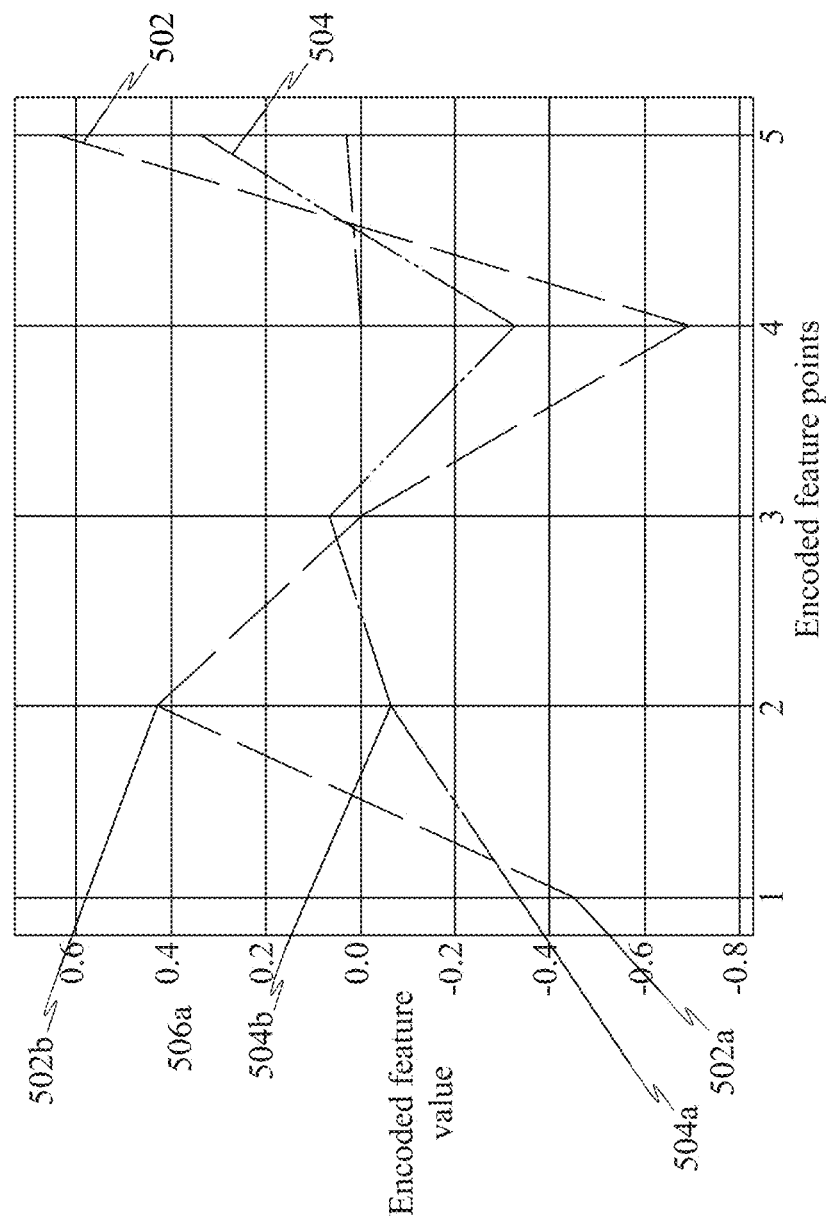
FIG. 5 illustrates an encoder output, in accordance with an embodiment.

In an embodiment, at step 306, the encoder of the LSTM autoencoder 204 may encode the plurality of acceleration data points within each window to obtain feature encodings. As an example, each of the time windows may comprise of 20 data points. The encoder may encode the 20 data points into 5 encoded feature points. That is to say, each of the plurality of time window may comprise 5 encoded feature points after encoding. FIG. 5 illustrates the encoder output. A first curve 502 corresponds to 5 encoded feature points of the first time window, a second curve 504 corresponds to 5 encoded feature points of the second time window, a third curve 506 corresponds to 5 encoded feature points of a third time window and so on.

In an embodiment, at step 308, the encoded feature points within each of the time windows may be fed to the decoder of the LSTM autoencoder 204. The decoder may decode the encoded feature points into the original input (input acceleration data points). As an example, the 5 encoded feature points may be decoded into 20 acceleration data points (original input). In certain scenarios, the output from the decoder may not be same as the original input. The learning parameters of the decoder needs to be optimized to get the output as close to input (input acceleration points). The weights/learning parameters of the decoder may be optimized by computing a optimization function.

In an embodiment, at step 310, the optimization function may compute an error value by computing a difference between the decoded acceleration data points and the input acceleration data points.

In an embodiment, at step 312, the optimization function may backpropagate the error value to hidden layers of the autoencoder 204, until the error value is minimized.

In an embodiment, once trained, the training model may be installed into the automobile 10.

Having discussed the steps involved in building the training model, the implementation of the IMU sensor data analytics system 102 in real-time is discussed hereunder.

Figure 6:
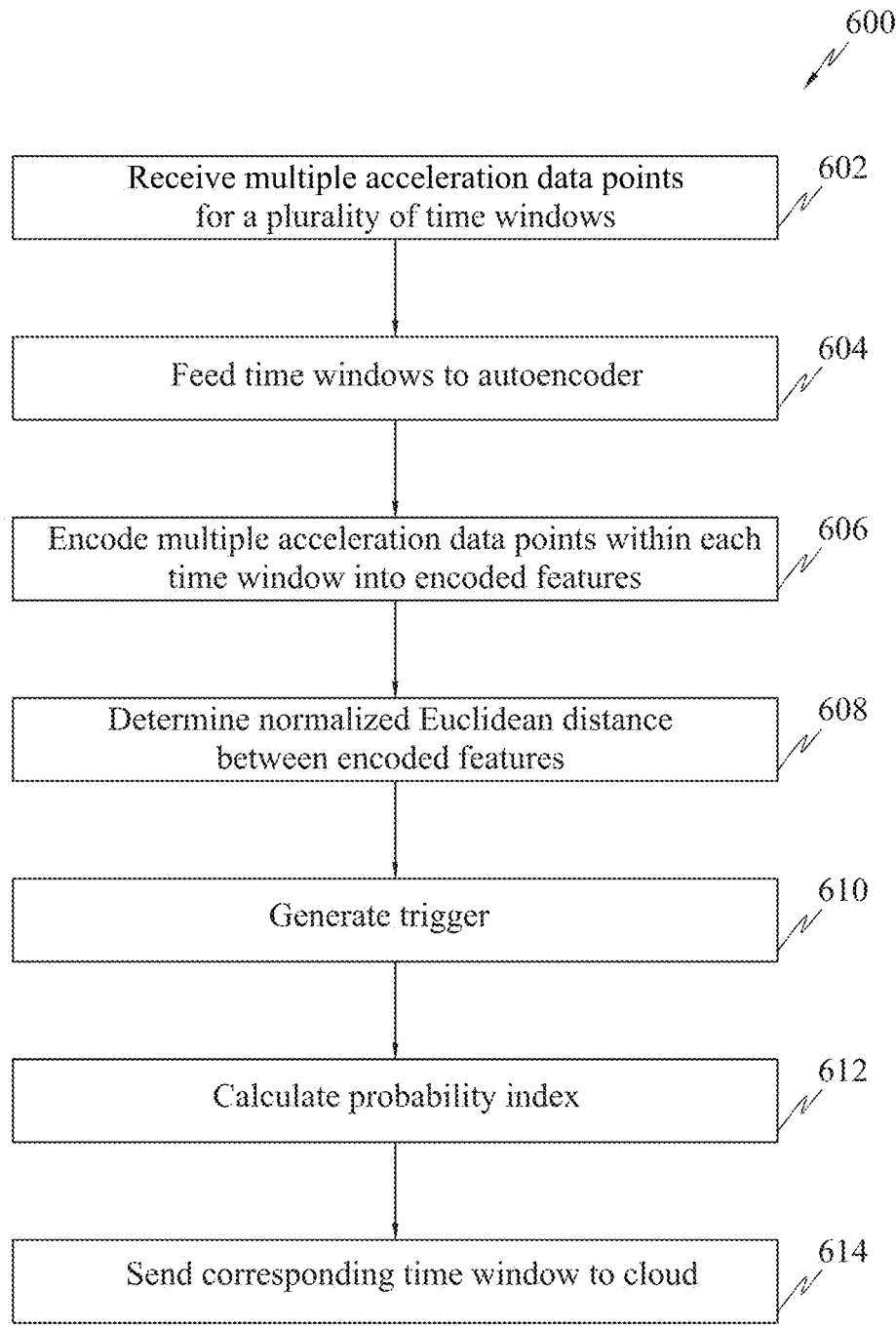
FIG. 6 is a flowchart 600 illustrating the implementation of the IMU sensor data analytics system 102 in real-time, in accordance with an embodiment.

FIG. 6 is a flowchart 600 illustrating the implementation of the IMU sensor data analytics system 102 in real-time, in accordance with an embodiment.

In an embodiment, at step 602, the plurality of acceleration data points corresponding to the plurality of time windows may be received from the accelerometer of the sensing system 202.

In an embodiment, at step 604, the plurality of time windows may be fed to the LSTM autoencoder 204.

In an embodiment, at step 606, the plurality of acceleration data points within each time window may be encoded to obtain feature encodings.

In an embodiment, at step 608, normalized Euclidean distances corresponding to encoded feature points of the consecutive time windows may be computed by using a formula provided below:

$$distance_t = \frac{\|f_t - f_{t-1}\|^2}{(\|f_t\|^2 \times \|f_{t-1}\|^2)^{\frac{1}{2}}} \quad (1)$$

wherein the distances is the normalized Euclidean distance, numerator corresponds to the Euclidean distance between encoded feature points of the consecutive time windows and denominator corresponds to normalization term. As an example, referring to FIG. 5, normalized Euclidean distance between a first encoded feature point 502a of the first curve 502 and a first encoded feature point 504a of the second curve 504, the Euclidean distance between a second encoded feature point 502b of the first curve 502 and a second encoded feature point 504b of the second curve 504 and so on is computed. The normalized Euclidean distance may be computed to obtain trigger points. Likewise, Euclidean distances between each of the corresponding encoded feature points of the consecutive time windows may be computed to obtain trigger indexes.

Figure 7:
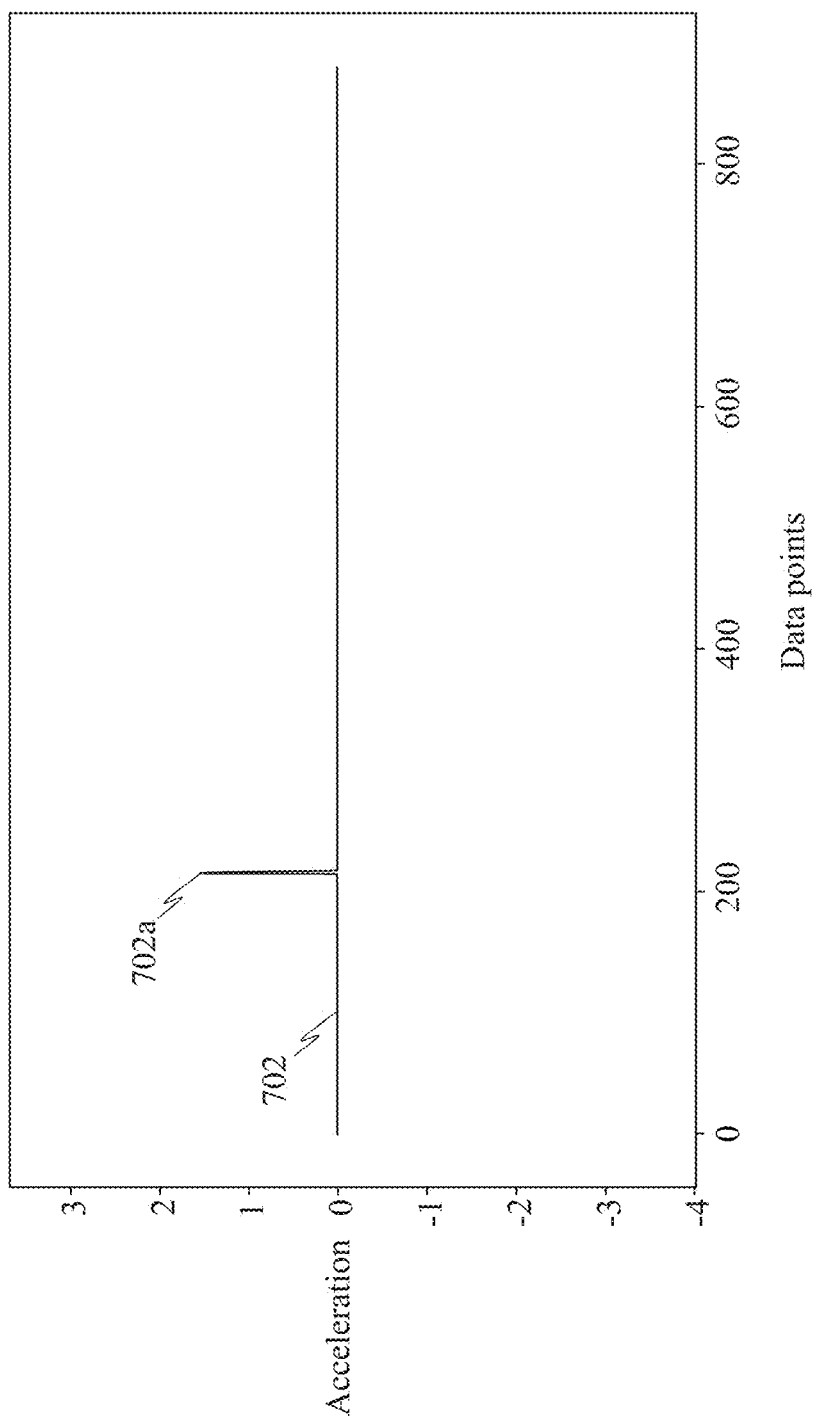
FIG. 7 illustrates representation of normalized Euclidean distances, in accordance with an embodiment.

In an embodiment, a threshold trigger index may be pre-set. As an example, the threshold trigger index may be 1.3. Referring to FIG. 7, the normalized Euclidean distances may be represented as a normalized Euclidean curve 702. In the normalized Euclidean curve 702, the Euclidean distance lesser than the threshold trigger index may be suppressed to 0. As an example, if the computed normalized Euclidean distance is less than 1.3, then the normalized Euclidean distance may be suppressed to 0. The same process may be repeated for all the normalized Euclidean distances that may be lesser than the threshold trigger index. The trigger index 702a, crossing the threshold trigger index may be saved.

In an embodiment, at step 610, a trigger is generated if any one of the normalized Euclidean distances is greater than the threshold trigger index. The trigger indicates the occurrence of the anomaly.

In an embodiment, at step 612, the first output module 206 may generate a probability value. The probability value corresponds to probability of occurrence of the anomaly. The anomaly may be the automobile accident. The probability value of the occurrence of the anomaly based on the IMU sensor data analytics system 102 may be calculated by the formulae provided below:

$$P_T(\text{trig\_index}) = 1/(1 + 50 \tan(1.3 - \text{trig\_index})) \quad (2)$$

wherein $P_T$ (trig_index) corresponds to the probability value which determines the probability of the occurrence of the anomaly based on the IMU sensor data analytics system 102, 1.3 is the threshold trigger point and trig_index corresponds to normalized Euclidean distance. For each of the trig_index, corresponding probability of occurrence of the anomaly may be calculated. As an example, let the trigger indexes be 0.50, 1.00, 1.05, 1.25, 1.3, 1.4, 1.8 and so on and the corresponding probabilities, i.e. 0.02, 0.23, 0.27, 0.45, 0.50, 0.60, 0.89 may be obtained by using equation 2.

In an embodiment, at step 614, the time window for which the trigger may be generated is sent to the cloud 12 for further analysis.

Having discussed the implementation of the IMU sensor data analytics system 102, various modules of a video analytics system 104 is discussed hereunder.

Figure 8:
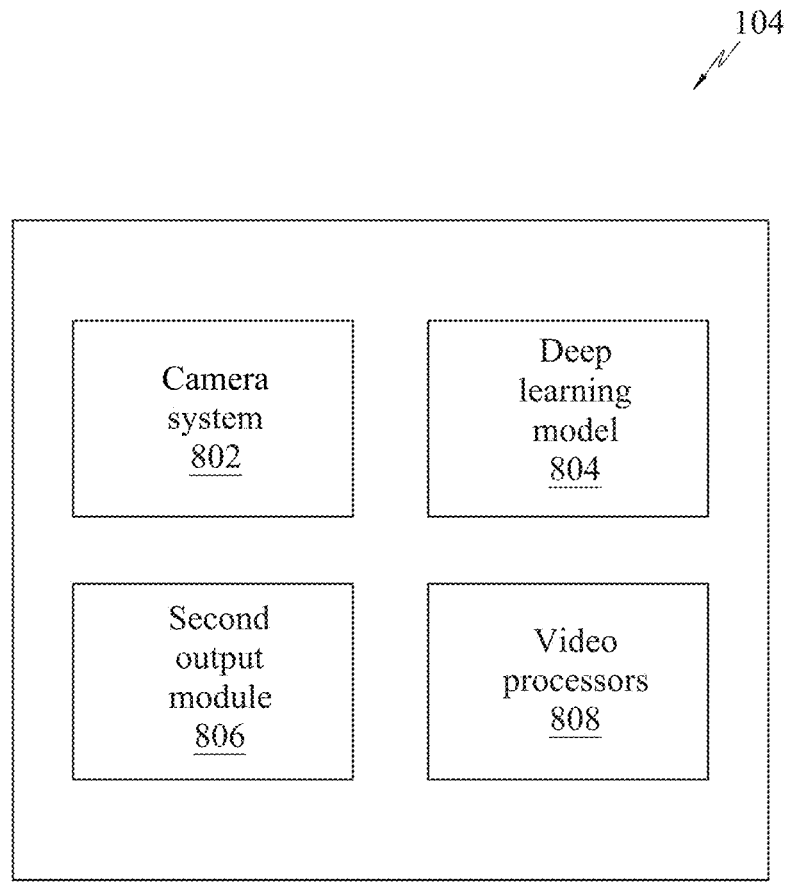
FIG. 8 illustrates various modules of the video analytics system 104 of the system 100, in accordance with an embodiment.

Referring to FIG. 8, various modules of the video analytics system 104 of the system 100, in accordance with an embodiment is disclosed. The video analytics system 104 may include a camera system 802, a deep learning model 804, a second output module 806 and video processors 808.

In an embodiment, the camera system 802 may be configured to record information corresponding to the automobile 10. The camera system 802 may be a dashboard camera, that may record information corresponding to interior and exterior of the automobile 10. The information may correspond to videos and images of the events occurring in the vicinity of the automobile 10. In addition, the recorded videos and images may be automatically communicated through a communication network. In an embodiment, the deep learning model 804 may comprise of a neural network. The neural network may be a convolutional neural network. The neural network may comprise an input layer, hidden layers and an output layer. The captured videos by the camera system 802 may be fed to the input layer of neural network.

In an embodiment, the deep learning model 804 may be trained using training videos. The training videos may be obtained from different sources such as YOUTUBE, GOOGLE videos and so on. The deep learning model 804 may continuously learn from the output generated from the second output module 806.

In an embodiment, the second output module 806 may generate the output of the video analytics system 104. The output may be a probability of occurrence of the anomaly corresponding to the automobile 10.

In an embodiment, the video processors 808 may be implemented in the form of one or more processors and may be implemented as appropriate in hardware, computer executable instructions, firmware, or combinations thereof. Computer-executable instruction or firmware implementations of the video processors 808 may include computer-executable or machine-executable instructions written in any suitable programming language to perform the various functions described. Further, the video processors 808 may execute instructions, provided by the various modules of the video analytics system 104.

Having discussed the various modules of a video analytics system 104, the implementation of the deep learning model 804 is discussed hereunder.

Referring to FIG. 9, a flowchart 900 illustrating a method of training the video analytics system 104 is disclosed, in accordance with an embodiment.

In an embodiment, at step 902, the neural network may receive a plurality of training videos. The training videos may be labelled as either '1' or '0', wherein '1' represents occurrence of the anomaly and '0' represents the non-occurrence of the anomaly. The training videos may be of varying lengths. Each of the training video may comprise of "m" no of frames, wherein "m" may depend upon frame rate and length of the video. As an example, if the frame rate of the video is 30 fps (frames/sec) and the video length is 4 secs, the number of frames obtained may correspond to 120 frames (30 fps×4 secs).

In an embodiment, at step 904, the plurality of videos may be divided into a plurality of segments. The number of segments may vary.

In an embodiment, at step 906, each of the segment may further be divided into a plurality of frames. As an example, each of the segment may be divided into 16 frames. The video may be divided in such a way that the frames of a segment may overlap the frames from the consecutive segment. The overlap may be of 5 frames of each segment. As an example, a first segment may include of 1-16 frames, a second segment may include 12-27 frames and so on, wherein the overlap is for 5 frames of each segment. The frames of the segments may be overlapped to ensure that, the information of a frame is not lost. The number of segments may depend upon the frame rate, video length and overlap of segments.

In an embodiment, at step 908, the plurality of segments may be fed to the neural network.

In an embodiment, at step 910, the neural network may be trained to learn optical flow and spatial features of pixels across consecutive plurality of frames. The neural network may be trained to determine a pattern of apparent position of objects, surfaces and edges in the consecutive frames. Further the neural network may determine the movement of pixels in the consecutive frames. The neural network determine spatial distribution of the objects in the video over a three-dimensional plane. The neural network may have 3D layers, wherein first two (2D) dimensions may correspond to spatial/image feature and third (3D) dimension may define the sequence of the frames in the video. The neural network may identify the frames comprising the anomaly based on the optical flow and spatial features of pixels. That is to say, the first few layers of the neural network may learn the spatial features and as we go deep into the layers, the neural network may learn more complex pattern which may correspond to flow/motion features.

In an embodiment, at step 912, multiple instance learning ranking loss with sparsity and smoothness constraint. In real-world scenarios, anomaly often occurs only for a short time. In this case, the scores of the instances (segments) in the anomalous video should be sparse, indicating only a few segments may contain the anomaly. Also, since the video is a sequence of segments, the anomaly score should vary smoothly between video segments. Therefore, temporal smoothness between anomaly scores of temporally adjacent video segments may be enforced by minimising the difference of scores for adjacent video segments.

In an embodiment, at step 914, the loss function may be determined to minimize the error to obtain an optimized output value. The loss function may be defined in such a way that it enables the neural network to learn which particular segment in the accident video is likely to comprise the anomaly and which segments are most similar to that of non-anomaly segments. The loss function may backpropagate the error value to hidden layers of the neural network to minimize the error value.

The deep machine learning model 804 may continuously train the video analytics system 104 to obtain the optimized weights/learning parameters for better performance.

Having discussed the implementation of the deep machine learning model 804, implementation of the video analytics system 104 is discussed hereunder.

FIG. 10 is a flowchart 1000, illustrating the implementation of the video analytics system 104, in accordance with an embodiment.

In an embodiment, at step 1002, the video analytics system 104 may receive plurality of videos from the camera system 802. The videos may comprise of events recorded through front windscreen of the automobile 10.

At step 1004, the video may be divided into plurality of segments. The number of segment may depend upon the frame rate, video length and the overlap of the videos.

In an embodiment, at step 1006, each of the plurality of segments may be further divided into a plurality of frames. The number of plurality of frames may be 16.

In an embodiment, at step 1008, the plurality of segments may be fed to the neural network.

In an embodiment, at step 1010, the neural network may learn the optical flow and spatial features of pixels across consecutive plurality of frames.

In an embodiment, at step 1012, the neural network may identify the frame comprising the anomaly and may predict the corresponding segment with the output value. The output value may correspond to the probability of occurrence of the anomaly. As an example, the neural network may output a probability value of 0.90 (probability value of the occurrence of the anomaly based on the video analytics system 104) for a segment comprising the anomaly.

In an embodiment, at step 1014, the segments comprising the anomaly may be sent to cloud 12 for further analysis.

FIG. 11 is a flowchart 1100, illustrating training of the deep machine learning model 804, in accordance with another (second embodiment) embodiment.

In an embodiment, at step 1102, the neural network may receive a plurality of training videos. The training videos may be of varying lengths.

In an embodiment, at step 1104, each of the plurality of the videos may be divided into plurality of segments. The number of segments may vary. Referring to FIG. 12, the plurality of segments may include a first segment 1202, a second segment 1204, a third segment 1206 and so on.

In an embodiment, at step 1106, each segment 1202, 1204, 1206 may further be divided into a plurality of frames.

In an embodiment, at step 1108, the frames of the first segment 1202 may be fed to the neural network in a form of sequence to study the optical flow across the consecutive frames of the first segment 1202. As an example, video of 4 seconds may be divided into 4 segments, wherein each segment may comprise of 16 frames. The 16 frames may be fed to the neural network as sequence.

In an embodiment, at step 1110, each frame of the first segment 1202 may be fed to neural network. The neural network may study the spatial features of each frame. As an example, the first segment 1202 may include a first frame, a second frame, a third frame and so on. The first frame may be fed to the neural network to study the spatial features of the first frame. Then the second frame may be fed to the neural network to study the spatial features of the second frame. This may be repeated for all the frames of the first segment 1202.

In an embodiment, the process step (1108, 1110) may be repeated for every segment 1202, 1204, 1206 and the corresponding frames. As an example, the first segment 1202 and the corresponding frames of the first segment 1202 may be fed to the neural network to study the optical flow and the spatial features, respectively. Then the second segment 1204 and the corresponding frames of the second segment 1204 may be fed to the neural network after which the third segment 1206 and the corresponding frames of the third segment 1206 may be fed to the neural network. The process may be repeated for all the segments of the video.

In an embodiment, referring to FIG. 12, optical flow outputs 1202a, 1204a, 1206a corresponding to each of the segments 1202, 1204, 1206 may be combined to obtain a first segmental output 1208. Similarly, spatial flow outputs 1202b, 1204b, 1206b corresponding to each of the frames of segments 1202, 1204, 1206 may be combined to obtain a second segmental output 1210. As an example, an optical flow output 1202a of the first segment 1202, an optical flow output 1204a of the second segment 1204, an optical flow output 1206a of the third segment 1206 and so on may be combined to obtain the first segmental output 1208. Similarly, spatial flow output 1202b of plurality of frames of first segment 1202, spatial flow output 1204b of plurality of frames of second segment 1204, spatial flow output 1206b of plurality of frames of third segment 1206 and so on may be combined to obtain the second segmental output 1210.

In an embodiment, at step 1112, the first segmental output 1208 and the second segmental output 1210 may be combined to obtain an output 1212.

In an embodiment, at step 1114, ground truth video label may be obtained. That is to say, the video may be labelled based on the anomaly output 1212. When the neural network identify the video comprising the anomaly, then the corresponding video may be labelled as "1", wherein "1" corresponds to probability of occurrence of the anomaly. Otherwise, the video may be labelled as "0", wherein "0" corresponds to non-occurrence of the anomaly.

In an embodiment, at step 1116, predicted value may be compared with the ground truth value to determine an error. The error value may correspond to difference between predicted value ("1" or "0") and output value.

In an embodiment, at step 1118, a loss function may be determined to minimize the error value to obtain an optimized output value. The loss function may backpropagate the error value to a hidden layers of the neural network to minimize the error value.

The deep learning model 804 may continuously train the video analytics system 104 in to obtain the optimized output value.

Having discussed the training of the deep learning model 804, implementation of the video analytics system 104 in accordance with second embodiment is discussed hereunder.

FIG. 13 is a flowchart 1300, illustrating the implementation of the video analytics system 104, in accordance with an embodiment.

In an embodiment, at step 1302, the video analytics system 104 may receive a plurality of videos from the camera system 802.

In an embodiment, at step 1304, video may be divided into plurality of segments 1202, 1204, 1206.

In an embodiment, at step 1306, each of the plurality of segments 1202, 1204, 1206 may be further divided into a plurality of frames.

In an embodiment at step 1308, the first segment 1202 may be fed to the neural network to learn the optical flow across the plurality of frames of the first segment 1202.

In an embodiment, at step 1310, the plurality of frames of the first segment 1202 may be fed to the neural network to study spatial features across consecutive plurality of frames. As an example, the first frame of the first segment 1202 may be fed to the neural network to study the spatial features, after which, the second frame of the first segment 1202 may be fed to the neural network. The process may be repeated for all the frames of the first segment 1202. The process steps (1308, 1310) may be repeated for every segment 1202, 1204, 1206 and the corresponding frames.

In an embodiment, referring to FIG. 12, the optical flow outputs 1202a, 1204a, 1206a corresponding to each of the segments 1202, 1204, 1206 may be combined to obtain the first segmental output 1208. Similarly, the spatial flow outputs 1202b, 1204b, 1206b corresponding to each of the frames of segments may be combined to obtain a second segmental output 1210.

In an embodiment, at step 1312, the first segmental output 1208 and the second segmental output 1210 may be combined to obtain the anomaly output 1212.

In an embodiment, at step 1314, anomaly probability for plurality of segments may be predicted.

In an embodiment, at step 1316, the video corresponding to the anomaly may be sent to the cloud 12 for further analysis.

FIGS. 14A-B depict a flowchart 1400, illustrating yet another method of training deep learning model 804 of the video analytics system 104, in accordance with another embodiment (third embodiment).

In an embodiment, referring to FIG. 14A, at step 1402, a plurality of training videos may be fed. The video may be divided into plurality of video frames.

In an embodiment, at step 1404, features corresponding to objects present in the video frames may be extracted. The features may correspond to objects present in the video frames.

In an embodiment, at step 1406, the object features may be fed to a neural network. The neural network may be LSTM. The LSTM may be trained to identify a third party automobile 10 using an attention mechanism, wherein the third party automobile 10 may be a foreign automobile 10 which may be involved in the accident. The attention mechanism may decide the feature on which the neural network should pay attention on. As an example, the attention mechanism may pay attention on the third party automobile 10 in the video frames.

In an embodiment, at step 1408, the LSTM may learn optical flow to obtain an optical flow feature vector. Further steps will be explained later, in flowchart 1500 (FIG. 15).

In an embodiment, referring to FIG. 14B, at step 1410, a plurality of training videos may be fed. Further, a plurality of video frames may be obtained.

In an embodiment, at step 1412, the optical flow features of the video frame may be extracted using a FARNEBACK algorithm.

In an embodiment, at step 1414, features of optical flow features may be extracted. The features of optical flow features may correspond to histogram of optical flow (HOF), histogram of oriental gradient (HOG) and motion based histogram (MBH).

In an embodiment, at step 1416, the features of optical flow features may be fed to a Gaussian mixture model (GMM). The GMM may be used to model the distribution of the features of optical flow features extracted from the video frames.

In an embodiment, at step 1418, the GMM model may be encoded to a 1D (one dimensional) feature vector using a Fisher encoder. Further steps will be explained later, in flowchart 1500 (FIG. 15).

In an embodiment, referring to FIG. 15, at step 1502, the optical flow feature vector (step 1408) and the 1D feature vector (step 1418) may be fed to a neural network.

In an embodiment, at step 1504, the neural network may be trained to label the video frame based on the optical flow feature vector and the 1D feature vector. When the neural network identify the video frame comprising the anomaly, then the corresponding video frame may be labelled as "1", wherein "1" corresponds to probability of occurrence of the anomaly. Otherwise, the video frame may be labelled as "0", wherein "0" corresponds to non-occurrence of the anomaly.

In an embodiment, at step 1506, an error value is determined. The error value may correspond to difference between predicted value ("1" or "0") and output value.

In an embodiment, at step 1508, a loss function may be determined to minimize the error value to obtain an optimized output value. The loss function may backpropagate the error value to a hidden layers of the neural network to minimize the error value.

The deep learning model 804 may continuously train the video analytics system 104 to obtain the optimized weights/learning parameters for better performance.

Having discussed the training of the deep learning model 804, implementation of the video analytics system 104 in accordance with third embodiment is discussed hereunder.

FIG. 16A-B depict a flowchart 1600, illustrating the implementation of the video analytics system 104 in real time, in accordance with an embodiment.

In an embodiment, at step 1602, the video analytics system 104 may receive a plurality of videos from the camera system 802. Further, a plurality of video frames may be obtained.

In an embodiment, at step 1604, object features may be extracted from the video frames.

In an embodiment, at step 1606, the object features may be fed to a LSTM network.

In an embodiment, at step 1608, the LSTM network may learn optical flow to obtain an optical flow feature vector. Further steps will be explained later, in flowchart 1700 (FIG. 17).

In an embodiment, at step 1610, the video analytics system 104 may receive a plurality of videos from the camera system 802. Further, a plurality of video frames may be obtained.

In an embodiment, at step 1612, optical flow features may be extracted using the FARNEBACK algorithm.

In an embodiment, at step 1614, HOG, HOF and MBH may be extracted from the optical flow features.

In an embodiment, at step 1616, the HOG, HOF and MBH may be fed to GMM.

In an embodiment, at step 1618, the GMM may be encoded to a 1D feature vector using a Fisher encoder. Further steps will be explained later, in flowchart 1700 (FIG. 17).

In an embodiment, referring to FIG. 17, at step 1702, the optical flow feature vector (step 1608) and the 1D feature vector (step 1618) may be fed to a trained neural network.

In an embodiment, at step 1704, the trained neural network may label the video frame based on the optical flow feature vector and the 1D feature vector. The label may correspond to probability value of occurrence of the anomaly.

In an embodiment, at step 1706, the video corresponding to the anomaly may be sent to the cloud 12 for further analysis.

In an embodiment, the probability of occurrence of the anomaly may be calculated from the probability values obtained from the IMU sensor data analytics system 102 and the video analytics system 104. The probability of occurrence of the anomaly may be computed from the equation provided below:

$$P(\text{event\_trigger}) = (W_T \times P_T(T)) + (W_V \times P_V(V)) \quad (3)$$

wherein, P(event_trigger) corresponds to the probability of occurrence of the anomaly, $P_T(T)$ corresponds to a probability of occurrence of anomaly based on the IMU sensor data analytics system 102, $P_V(V)$ corresponds to a probability of occurrence of anomaly based on the video analytics system 104, $W_T$ corresponds to probability weightage of the probability value based on the IMU sensor data analytics system 102 and $W_V$ corresponds to probability weightage of the probability value based on the video analytics system 104. The weightage $W_T$ and $W_V$ may be manually set. Higher weightage may be given $W_T$ considering the sensitivity and the robustness of the sensing system 202 of the IMU sensor data analytics system 102. As an example, $W_T$ may be 0.6 and $W_V$ may be 0.4.

In an embodiment, when the probability of the occurrence of the anomaly is more than 0.5 (50%), the anomaly may be detected and the values of P(event_trigger) and corresponding $P_T(T)$ and $P_V(V)$ may be sent to the cloud 12 for further analysis.

In another embodiment, methods (algorithms) corresponding to the flowcharts 1000, 1300 and 1600-1700 may be used in combination to determine the occurrence of the accident. Further, weightages may be provided to each of the methods to compute a probability value.

In another implementation, the system 100 in the automobile 10 may comprise the IMU sensor data analytics system 102. As explained earlier, the trigger is generated if any of the normalized Euclidean distances is greater than the threshold trigger point. The trigger indicates the occurrence of the anomaly. The video corresponding to the trigger may be communicated to the cloud 12. The scrutiny of the scenario in the corresponding video may be further analysed in the cloud 12. The cloud 12 may comprise a deep learning model, that may be trained to obtain probability of occurrence of the anomaly. The deep learning model in the cloud 12 may be similar to the deep learning model 804 in the video analytic system 104 of the system 100. The obtained information from the cloud 12 may be further analysed by the report generator to generate the crash report 1800.

In an embodiment, the values of P (event_trigger) and corresponding, $P_T(T)$ and $P_V(V)$, time window for which a trigger is generated, the video corresponding to the anomaly may be sent to the cloud 12. These data may be analyzed by the report generator 106 to generate the crash report 1800.

Referring to FIG. 18, in an embodiment, the crash report 1800 may be generated based on the information obtained from the IMU sensor data analytics system 102 and video analytics system 104. The crash report 1800 may comprise information corresponding to the anomaly. The anomaly may be automobile accident. The crash report 1800 as an example, but not limited to, may comprise information corresponding to an accident scenario 1802, an accident type 1804, day/night 1806, road surface 1808, weather 1810, visibility 1812, license plate number 1814 and so on.

In an embodiment, the accident scenario 1802 may correspond to the vicinity of occurrence of the accident. Referring to FIG. 19, the vicinity may be a junction 1902, alley 1904, a city road 1906, a field road 1908, a highway 1910, a parking basement 1912 and so on.

In an embodiment, the accident scenario 1802 may be identified with help of data provided by the video analytics system 104. The system 100 may be trained on a dataset, wherein the dataset comprises of plurality of images. The dataset may be fed to a learning model. The learning model may be an image analysis neural network INCEPTION V3. INCEPTION V3, which may comprise of a feature extraction part and a classification part. The feature extraction part may extract the features from the images of the dataset and the classification part may classify the images into different groups. The groups may correspond to, as an example, but not limited to, junction 1902, the alley 1904, the city road 1906, the field road 1908, the highway 1910 and the parking basement 1912.

In an embodiment, during real time surveillance, image frames of the video corresponding to the accident may be fed into the image analysis neural network INCEPTION V3. The trained image analysis neural network INCEPTION V3 may classify the images by extracting the features from the image frames. The image may be classified into one of the accident scenarios 1802.

In another embodiment, the accident scenario 1802 may be determined with help of data provided by the IMU sensor data analytics system 102. The GPS tracker of the sensing system 202 may track time at which the trigger is generated. The GPS tracker may obtain the latitude and longitude of the automobile 10 at the time corresponding to the trigger. The system 100 may use a third party application to identify the vicinity (accident scenario 1802) of the obtained latitude and longitude. The third party application may be as an example, but not limited to GOOGLE MAPS.

In an embodiment, the accident type 1804 may correspond to type of the accident. The accident type 1804 may be a head-on, a rear end, a sideswipe, a T-bone and so on.

In an embodiment, the accident type 1804 may be identified with help of data provided by the video analytics system 104. The system 100 may be trained on a dataset, wherein the dataset comprises of plurality of videos. The dataset may be fed to a learning model. The neural network may be trained to infer the accident type based on motion and spatial features. The learning model may be a deep neural network, that may be trained to pay attention (using LSTM attention mechanism) to the cause of an anomaly occurred in the video frames. The main cause of the anomaly may be the third party vehicles, motor cyclists and pedestrians across the video frames. Based on the motion and spatial features (e.g. co-ordinates of the automobile in relation to the automobile in which the video is captured), the neural network may classify the images as head-on, rear end, sideswipe, a T-bone and so on. As an example, if the image shows complete side portion of the third party automobile, then the image may be classified as T-bone. If the image shows a small portion of the side portion of the third party automobile, then the image may be classified as sideswipe.

In an embodiment, the day/night 1806 may corresponds to whether the accident occurred during day or night.

In an embodiment, the system 100 may be trained on a dataset, wherein the dataset comprises of plurality of images. RGB (Red Green Blue) colour values of each of the pixels of the images may be converted to HSV (Hue Saturation Value) model and features may be extracted from the HSV color space. Intensity of Hue, saturation and value may be represented on a scale. As an example, the intensity of value may be represented on a range 0-255, wherein "0" corresponds to completely dark and "255" corresponds to fully bright. The scale of the HSV color space may be divided into 3 bins. That is to say, each of the scale of hue, saturation and value may be divided into 3 bins. Each of the pixels of the image may be then classified into 1 bin of hue, saturation and value. Each image frame may be represented as a 3×3 vector=9 dimensional vector which may be fed to a classifier network. The classifier network may be a gradient boost classifier. The classifier may identify the bin to which the maximum number of pixels are present and may classify the image as day or night.

In an embodiment, during real time surveillance, pixels in the image frames of the video corresponding to the accident may be converted into HSV color space and features may be extracted. Intensity values may be represented on the range 0-255 and a scale representing (H, S, V) may be divided into 3 bins. Each of the pixels of the image may be then classified into 1 bin of H, S and V. Further, each image frame may be represented as a 9D vector and fed to the classifier network. The classifier may identify and classify the image frame as day or night.

In another embodiment, the day/night 1802 may be identified with help of data provided by the IMU sensor data analytics system 102. The GPS tracker of the sensing system 202 may give the location which may be fed to a third party software to obtain the time. The time may indicate whether the incident occurred during day or night.

In an embodiment, the road surface 1808 may correspond to condition of surface of road. A fully conventional network (FCN) may be fed with a plurality of image frames. FCN may be trained to extract a road region from the image frames and segment the road region. Image features (colour moment and texture features) may be extracted from the segmented road region and fed to train a SVM (Support Vector machine) classifier. The SVM classifier may classify the segmented road region into dry, wet and snow.

In an embodiment, during real time surveillance, image frames of the video corresponding to the accident may be fed into the trained FCN. The trained FCN may extract the road region from the image frames and segment the road region into different segments. The segments may then be fed to the SVM classifier and the SVM classifier may classify the road region as one of dry, wet and snow regions.

In another embodiment, the road surface 1808 may be identified with help of data provided by the IMU sensor data analytics system 102. The GPS tracker of the sensing system 202 may track time at which the trigger occurred. The GPS tracker may obtain the latitude and longitude of the automobile 10 at the time corresponding to the trigger. The system 100 may use a third party application to identify the road surface 1808 from the obtained latitude and longitude.

In an embodiment, the weather 1810 may correspond to the weather condition at the time of the accident.

In an embodiment, the weather 1810 may be identified with help of data provided by the video analytics system 104. The system 100 may be trained on a dataset, wherein the dataset comprises of plurality of images. The dataset may be fed to fully conventional network (FCN). FCN may be trained to extract a sky region from the image frames and segment the sky region. Image features may be extracted from the segments and fed to train a Support Vector Machine (SVM) classifier, which can be used to classify sunny or cloudy. SVM classifier may be trained on the images of the dataset and classify the images into different groups. The groups may correspond to rainy and non-rainy. A rain classifier may detect the rainy and non-rainy condition. In case, the weather is non-rainy, a sunny-cloudy classifier may be used to further classify, whether the weather is sunny or cloudy.

In an embodiment, the image frames that may be classified as non-rainy may be fed to the sunny-cloudy classifier. The sunny-cloudy classifier may be trained to convert RGB values of each of pixels in the sky region of image frames into HSV color space and features may be extracted from the HSV color space. Features may be a 10 bin histogram HSV from the sky region of image frames, contrast and haze from the image frames. A 10 bin HSV may be obtained by dividing the scale of the HSV color space into 10 bins. The extracted features may be sent to a SVM classifier, wherein SVM classifier may be trained to classify the corresponding image frames as sunny or cloudy.

In another embodiment, the weather 1410 may be identified with help of data provided by the IMU sensor data analytics system 102. The GPS tracker of the sensing system 202 may track time at which the trigger occurred. The GPS tracker may obtain the latitude and longitude of the automobile 10 at the time corresponding to the trigger. The system 100 may use a third party application to identify the weather corresponding to the obtained latitude and longitude In an embodiment, the visibility 1810 may correspond to the visibility of the road ahead of the automobile 10.

In an embodiment, the system 100 may be trained on a dataset, wherein the dataset comprises of plurality of images. RGB (Red Green Blue) colour values of each of the pixels of the images may be converted to HSV (Hue Saturation Value) model and features may be extracted from the image frames. The features extracted may be contrast feature and haze feature. The features may be fed to a SVM classifier. The SVM classifier may be trained to classify the corresponding images as foggy or clear.

In an embodiment, during real time surveillance, pixels in the image frames of the video corresponding to the accident may be converted into HSV color space and features may be extracted. The features may be fed to a SVM classifier and the trained SVM classifier may classify the image as either foggy or clear.

In an embodiment, license plate number 1814 of the foreign automobile may be identified, with help of data provided by the video analytics system 104. The system 100 may be trained on a dataset, wherein the dataset comprises of plurality of images. The dataset may be fed to a learning model. The learning model may be an image recognition neural network, that may be trained to pay attention to a license plate of the third party automobile in the images. The learning model may be trained to detect the characters printed on the license plate by OCR (Optical Character Recognition) method.

In an embodiment, during real time surveillance, image frames of the video corresponding to the accident may be fed to the image recognition neural network. The trained image analysis neural network may detect license plate of the third party automobile from the image frames. The trained neural network determines the license plate number 1814 of the third party automobile.

In an embodiment, a sketch plan 2000 may be generated. The sketch plan 2000 may correspond to sketch of an accident scene. The sketch plan 2000 may be generated from the crash report 1800, acceleration data points from sensing system 202 and third party applications. The third party applications may be GOOGLE MAPS, a drawing tool and so on. The sketch plan 2000 may comprise sketches corresponding to a path traversed by the automobile 10, different events 2004, 2006 corresponding to the automobile 10, first position 2010 of a user automobile 10, second position 2008 of the third party automobile and so on, wherein the events corresponding to the automobile 10 may be acceleration 2004, hard breaking 2006 and so on.

In an embodiment, the GPS tracker of the sensing system 202 may identify the latitude and longitude of the automobile 10 at the time of the accident. A location map 2012 of the automobile 10 may be identified from the third party application such as GOOGLE MAPS. Further, the path 2002 traversed by the automobile 10 may also be determined from the GPS tracker. The events corresponding to the automobile 10 may be determined from the IMU sensor data analytics system 102. The events corresponding to the automobile 10 may be determined by analysing the acceleration data points obtained from the sensing system 202 of the IMU sensor data analytics system 102 and the calculated normalized Euclidean distances. As an example, the acceleration 2004 may be obtained from the acceleration data points and hard breaking 2006 may be obtained from the calculated normalized Euclidean distances. That is to say, from the normalized Euclidean distances, values less than 1.3 (threshold trigger index) may correspond to hard breaking 2006.

In an embodiment, the first position 2010 of the user automobile 10 and the second position 2008 of the third party automobile, motor cyclists and pedestrians may be determined from the crash report 1800 and the third party application such as GOOGLE MAP. The accident type 1804 from the crash report 1800 and the data available from the third party application may be analysed to determine the, the first position 2010 of the user automobile 10 and the second position 2008 of the third party automobile. As an example, if the accident type 1804 may be T-bone, then the front of the third party automobile may have collided into the side of the user automobile 10. The third party application may provide data corresponding to side roads. From the above information (accident type and third party data), it may be concluded that the third party automobile may have come from the side road at the time of the collision.

In an embodiment, the drawing tool may be used to sketch the path traversed by the automobile 10, the different events 2004, 2006 corresponding to the automobile 10, the position 2010 of the user automobile 10, the position 2008 of the third party vehicles, motor cyclists and pedestrians and so on.

In an embodiment, finalized crash report 2100 may be obtained, that may comprise consolidated information corresponding to the crash report 1800 and the sketch plan 2000. FIG. 21 is the finalized crash report 2100.

In an embodiment, the system 100 intelligently may pick up all the essential scenarios to improve the neural network performance, and may incorporate that into training set, re-train and redeploy the network, and may iterate this cycle over and over again until a set target on performance is reached and or maintained. For instance, the system 100 may pick up sharp cornering cases using IMU sensor data analytics system 102 input and incorporate the corresponding video feed into the training set tore-train the neural network and thereby imparting the self-learning capability into the system 100.

Having provided the description of the implementations of the system 100 for detecting anomalies and generating a report, hardware elements of the system 100 is discussed in detail hereunder.

FIG. 22 is a block diagram illustrating hardware elements of the system 100 of FIG. 1, in accordance with an embodiment. Similar hardware elements scaled to the extent required may be present in the automobile 10 and the server 14. The hardware elements may include a processor 2202, a memory module 2204, an input/output module 2206, a display module 2208, a communication interface 2210 and a bus 2212 interconnecting all the modules of the system 100.

The processor 2202 is implemented in the form of one or more processors and may be implemented as appropriate in hardware, computer executable instructions, firmware, or combinations thereof. Computer-executable instruction or firmware implementations of the processor 2202 may include computer-executable or machine-executable instructions written in any suitable programming language to perform the various functions described. Further, the processor 2202 may execute instructions, provided by the various modules of the IMU sensor data analytics system 102 and the video analytics system 104.

The memory module 2204 may include a permanent memory such as hard disk drive, may be configured to store data, and executable program instructions that are implemented by the processor 2202. The memory module 2204 may be implemented in the form of a primary and a secondary memory. The memory module 2204 may store additional data and program instructions that are loadable and executable on the processor 2202, as well as data generated during the execution of these programs. Further, the memory module 2204 may be a volatile memory, such as a random access memory and/or a disk drive, or a non-volatile memory. The memory module 2204 may comprise of removable memory such as a Compact Flash card, Memory Stick, Smart Media, Multimedia Card, Secure Digital memory, or any other memory storage that exists currently or may exist in the future.

The input/output module 2206 may provide an interface for input devices such as computing devices, keypad, touch screen, mouse, and stylus among other input devices; and output devices such as speakers, printer, and additional displays among others. The input/output module 2206 may be used to receive data or send data through the communication interface 2210.

Liquid Crystal Displays (OLCD) or any other type of display currently existing or which may exist in the future.

The communication interface 2210 may include a modem, a network interface card (such as Ethernet card), a communication port, and a Personal Computer Memory Card International Association (PCMCIA) slot, among others. The communication interface 2210 may include devices supporting both wired and wireless protocols. Data in the form of electronic, electromagnetic, optical, among other signals may be transferred via the communication interface 2210. Further, the communication interface 2210 may provide an interface between the IMU sensor data analytics 102 system and cloud 12, the video analytics system 104 with cloud and the system 100 and external networks.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for determining occurrence of automobile accidents and characterizing the accidents, the system comprising:
   a sensing system disposed in the automobile to detect acceleration of the automobile;
   at least one sensor data processor disposed in the automobile, wherein the sensor data processor is configured to:
      receive acceleration data points for a plurality of time windows, wherein each of the time windows comprises multiple acceleration data points;
      encode the multiple acceleration data points within each of the time windows to obtain feature encodings for each of the time windows;
      determine distance between the encodings of at least two of the time windows; and
      verify whether the distance meets a threshold value, wherein meeting of the threshold value indicates a possibility of an accident;
   a camera system disposed in the automobile to capture video; and
   one or more video processors configured to feed at least a portion of video captured by the camera system, which comprises of neural networks and machine learning models to a video analysis neural network, wherein, the neural network is trained using a dataset to classify the accident type by extracting motion features and/or mapping spatial orientation of third party vehicles, motor cyclists and pedestrians across video frames.

2. The system as claimed in claim 1, wherein the sensing system comprises an accelerometer.

3. The system as claimed in claim 1, wherein the distance between the encoded data points of at least two of the time windows corresponds to Euclidean distance.

4. The system as claimed in claim 1, wherein the multiple acceleration data points within each of the time windows are encoded using an LSTM autoencoder.

5. The system as claimed in claim 1, wherein the system comprises:
   a training model, wherein the training model comprises an encoder and decoder, wherein the decoder is configured to:
      decode the encoded multiple acceleration data points within each of the time windows;
      determine error values using a first loss function by computing a difference between the decoded acceleration points with the input acceleration data points; and
      minimize the error values.

6. The system as claimed in claim 1, wherein the one or more video processors are configured to:
   divide the video into a plurality of segments, wherein each of the segments comprises a plurality of frames;
   feed the plurality of frames to the neural network;
   compare adjacent segments having plurality of frames to determine optical flow and spatial features; and
   predict the plurality of frames with a probability value.

7. The system as claimed in claim 6, wherein the probability value corresponds to a probability of occurrence of the accident.

8. The system as claimed in claim 7, wherein the system is trained using a plurality of training videos, wherein the system is configured to:
   divide the training videos into a plurality of segments, wherein each of the segments comprises of a plurality of frames;
   feed the plurality of frames to the neural network;
   compare at least two of adjacent frames in the plurality of frames to determine the optical flow and the spatial features;
   obtain a probability value for the plurality of frames;
   determine an error value by computing a difference between a predetermined expected value and the probability value;
   minimize the error values; and
   predict the plurality of frames.

9. The system as claimed in claim 1, wherein the one or more video processors are configured to:
   divide video from the camera system into a plurality of segments, wherein each of the segments comprises a plurality of frames;
   feed a sequence of at least one of the plurality of frames to the image recognition neural network;
   compare at least two of adjacent frames in the plurality of frames to determine optical flow features;
   feed at least one of the frames of the segment to the neural network to study spatial features;
   combine at least one of output of the neural network corresponding to the optical flow features to obtain first segmental output;
   combine at least one of output of the image analysis neural network corresponding to the spatial flow features to obtain second segmental output;
   combine the first segmental output and the second segmental output to obtain an output; and
   determine a possibility of an accident from the output.

10. The system as claimed in claim 1, wherein the one or more video processors are configured to:
    extract object features from a plurality of frames of the video;
    feed the object features to a LSTM neural network; and
    obtain a feature vector of objects in the plurality of frames.

11. The system as claimed in claim 8, wherein the one or more video processors are further configured to:
    obtain optical flow features from the plurality of frames;
    extract at least one feature from the optical flow features; and
    encode the extracted feature to one dimensional vector.

12. The system as claimed in claim 9, wherein the one or more video processors are further configured to:

feed the feature vector of objects and the one dimensional vector to another neural network; and label the plurality of video frames based on a combination of the feature vector and the one dimensional vector.

13. The system as claimed in claim 1, further comprising a server, wherein the server is configured to generate an accident report.

14. The system claimed in claim 11, wherein the server comprises a mechanism to automate the self-learning fine-tuning process of machine learning and deep learning model.

15. The system as claimed in claim 11, wherein the crash report comprises an accident type, an accident scenario, an accident location, visibility, weather and road conditions at the time of occurrence of the accident.

16. The system as claimed in claim 13, wherein a sketch plan is plotted using data used for preparing the crash report.

17. The system as claimed in claim 1, wherein the neural network is trained using the dataset to classify the accident type by extracting motion features and/or mapping spatial orientation of 3rd party vehicles, motor cyclists and pedestrians across video frames.

\* \* \* \* \*